(12) United States Patent
Wang et al.

(10) Patent No.: US 11,768,353 B2
(45) Date of Patent: Sep. 26, 2023

(54) OPTICAL IMAGING SYSTEM

(71) Applicant: ZHEJIANG SUNNY OPTICAL CO., LTD, Ningbo (CN)

(72) Inventors: Xiaofang Wang, Ningbo (CN); Guijie Zhu, Ningbo (CN); Biao Xu, Ningbo (CN); Qi Chen, Ningbo (CN); Kaiyuan Zhang, Ningbo (CN); Fujian Dai, Ningbo (CN); Liefeng Zhao, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 428 days.

(21) Appl. No.: 17/027,047

(22) Filed: Sep. 21, 2020

(65) Prior Publication Data

US 2021/0109317 A1    Apr. 15, 2021

(30) Foreign Application Priority Data

Oct. 15, 2019    (CN) .......................... 201910977212.8

(51) Int. Cl.
*G02B 13/00* (2006.01)
*G02B 7/02* (2021.01)
*G02B 9/34* (2006.01)

(52) U.S. Cl.
CPC .......... *G02B 13/004* (2013.01); *G02B 7/021* (2013.01); *G02B 7/026* (2013.01); *G02B 9/34* (2013.01)

(58) Field of Classification Search
CPC .... G02B 13/004; G02B 9/34; G02B 9/36–58; G02B 7/026
See application file for complete search history.

(56) References Cited

U.S. PATENT DOCUMENTS

| | | | |
|---|---|---|---|
| 2009/0059392 A1* | 3/2009 | Sano ........................ | G02B 9/34 359/715 |
| 2012/0062782 A1* | 3/2012 | Huang ..................... | G02B 9/34 348/340 |
| 2017/0176716 A1* | 6/2017 | Lai ..................... | G02B 27/0025 |
| 2017/0307844 A1* | 10/2017 | Lai ............................ | G02B 5/20 |
| 2019/0011666 A1* | 1/2019 | Yuza .................. | G02B 27/0037 |
| 2019/0025600 A1 | 1/2019 | Tang et al. | |
| 2019/0049696 A1* | 2/2019 | Bone ...................... | G02B 27/00 |
| 2020/0057283 A1 | 2/2020 | Wang | |
| 2020/0088972 A1* | 3/2020 | Yoo ....................... | G02B 13/004 |
| 2020/0099832 A1 | 3/2020 | Chang et al. | |
| 2020/0200990 A1* | 6/2020 | Furutake ................ | G02B 7/021 |
| 2020/0310226 A1* | 10/2020 | Feng ...................... | G02B 7/021 |
| 2020/0409066 A1* | 12/2020 | Hsieh ....................... | G02B 9/56 |

OTHER PUBLICATIONS

First Examination Report issued in corresponding Indian Application No. 202014039239; dated Sep. 22, 2021; 8 pgs.

* cited by examiner

*Primary Examiner* — Ephrem Z Mebrahtu
(74) *Attorney, Agent, or Firm* — HAUPTMAN HAM, LLP

(57) ABSTRACT

An optical imaging system includes an optical lens group including, sequentially along an optical axis from an object side to an image side, a first lens, a second lens, a third lens, and a fourth lens; a lens barrel, the optical lens group is accommodated in the lens barrel; and a plurality of spacers including at least two spacers disposed between the third lens and the fourth lens; the diameter D of the lens barrel at an end towards the object side and a maximum effective radius DT11 of an object-side surface of the first lens satisfy $2 \times DT11/D \geq 0.5$.

18 Claims, 15 Drawing Sheets

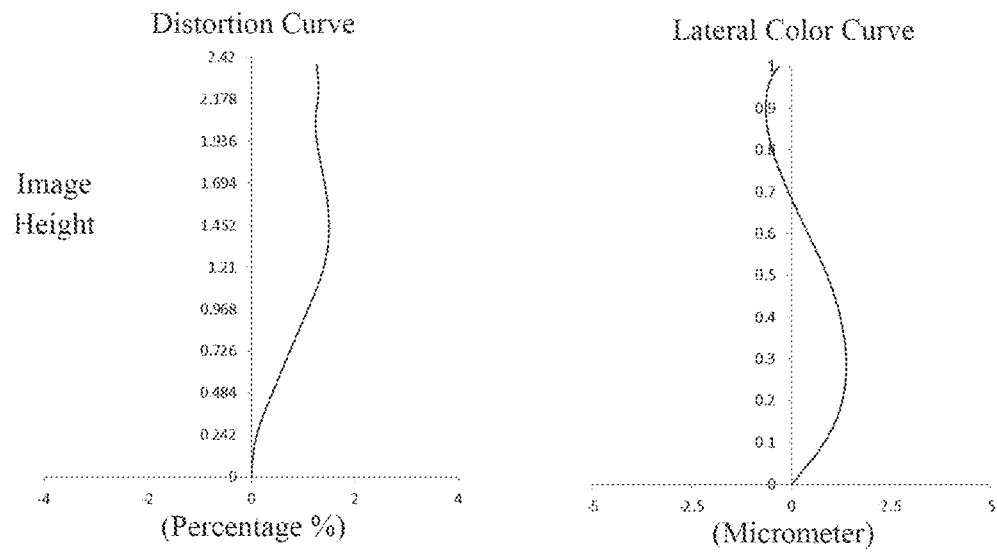
FIG. 6C
FIG. 6D
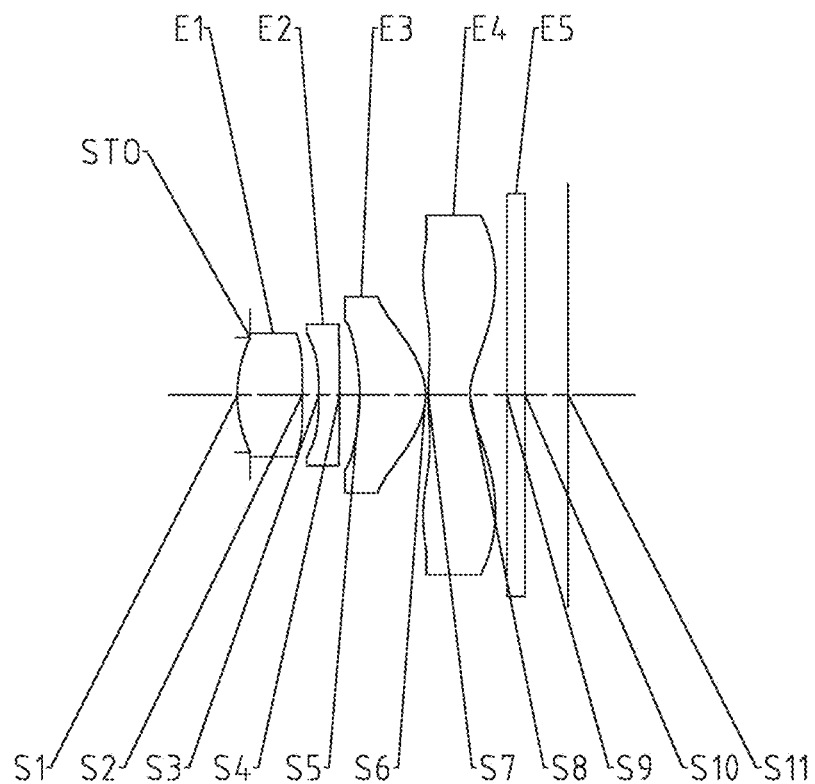
FIG. 7

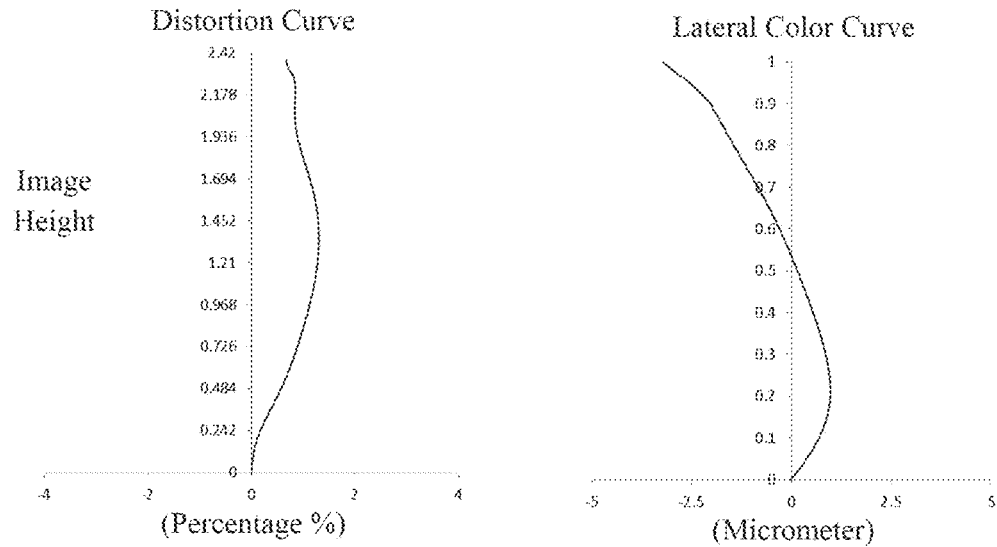
FIG. 10C
FIG. 10D
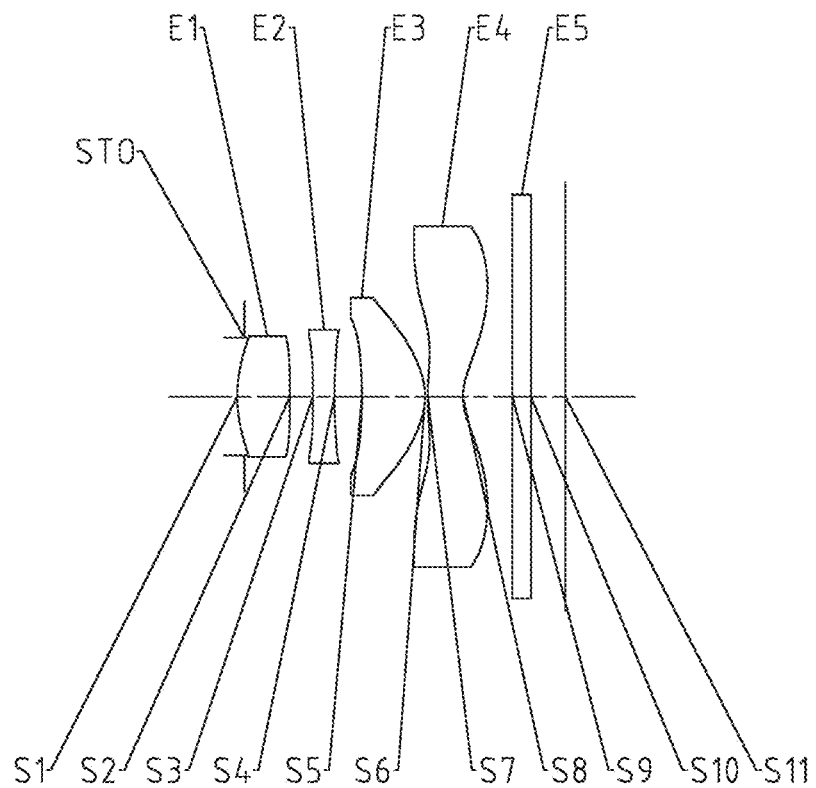
FIG. 11

OPTICAL IMAGING SYSTEM

CROSS-REFERENCE TO RELATED APPLICATIONS

This application claims the priority from Chinese Patent Application No. 201910977212.8, filed in the National Intellectual Property Administration (CNIPA) on Oct. 15, 2019, the contents of which are hereby incorporated by reference in their entirety.

TECHNICAL FIELD

The present application relates to the field of optical elements, and more particularly, to an optical imaging system.

BACKGROUND

In recent years, with the development of science and technology, the demand for an optical imaging system suitable for a portable electronic product is gradually increasing. Furthermore, the requirements on the shape and performance of the product are increasingly higher.

For example, the front camera module on the mobile phone is adjacent to the screen, and when the user expects the mobile phone to have a large screen ratio, and further expects the camera module to be miniaturized. In order to meet the miniaturization demands and meet the imaging requirement, there is a need for an optical imaging system capable of taking the miniaturization, low stray light, and high structural intensity into consideration.

SUMMARY

An aspect of the present disclosure provides an optical imaging system, an optical imaging system includes an optical lens group, the optical lens group, from an object side to an image side along an optical axis sequentially including a first lens, a second lens, a third lens, and a fourth lens; a lens barrel, the lens barrel being for receiving the optical lens group; and a plurality of spacers, the plurality of spacers including at least two spacers disposed between the third lens and the fourth lens; a diameter D of the lens barrel at an end towards the object side and a maximum effective radius DT11 of an object-side surface of the first lens satisfy $2 \times DT11/D \geq 0.5$.

In an implementation, the plurality of spacers further include: a first spacer, the first spacer being disposed between the first lens and the second lens; a distance LA from an object-side bearing surface of the first lens to an image-side bearing surface of the first lens and a distance LB from an object-side bearing surface of the second lens to an image-side bearing surface of the second lens satisfy $1.5 < LA/LB < 2.5$.

In an implementation, the plurality of spacers include: a second spacer, the second spacer being disposed between the second lens and the third lens; a third spacer, the third spacer being disposed between the third lens and the fourth lens; and a fourth spacer, the fourth spacer being disposed between the third spacer and the fourth lens; one of the third spacer and the fourth spacer is a metal spacer and the other is a plastic spacer; a difference LE between an effective radius of the third lens and an effective radius of the fourth lens satisfies $LE \geq 0.5$ mm; a distance L4 from an image-side bearing surface of the third lens to an object-side bearing surface of the fourth lens satisfies $L4 \geq 0.3$ mm.

In an implementation, the optical imaging system further includes a clamping ring, the clamping ring being disposed in the image-side direction of the fourth lens.

In an implementation, the first lens has a positive refractive power and an object-side surface thereof is convex; the second lens has a negative refractive power; the third lens has a positive refractive power, and an image-side surface thereof is convex; and the fourth lens has a negative refractive power and an image-side surface thereof is concave.

In an implementation, an axial distance TTL from the object-side surface of the first lens to an image plane of the optical imaging system and half of a diagonal length ImgH of an effective pixel area on the image plane satisfy $TTL/ImgH < 1.6$; and a maximum effective radius DT11 of the object side surface of the first lens and the half of a diagonal length ImgH of an effective pixel area on the image plane satisfy $DT11/ImgH < 0.3$.

In an implementation, a maximum effective radius DT12 of the image-side surface of the first lens and an edge thickness ET1 of the first lens satisfy $0.4 < ET1/DT12 < 0.9$.

In an implementation, a maximum effective radius DT31 of an object-side surface of the third lens and a maximum effective radius DT41 of an object-side surface of the fourth lens satisfy $0.3 < DT31/DT41 < 0.8$.

In an implementation, an edge thickness ET3 of the third lens and a center thickness CT3 of the third lens on the optical axis satisfy $0.2 < ET3/CT3 < 0.7$.

In an implementation, a center thickness CT4 of the fourth lens on the optical axis and an edge thickness ET4 of the fourth lens satisfy $0.4 < CT4/ET4 < 0.9$.

In an implementation, an effective focal length f1 of the first lens and an effective focal length f3 of the third lens satisfy $0.2 < f3/f1 < 0.7$.

In an implementation, a total effective focal length f of the optical imaging system, an effective focal length f2 of the second lens, and an effective focal length f4 of the fourth lens satisfy $1.0 < f/f2 - f/f4 < 2.0$.

In an implementation, an effective focal length f3 of the third lens and a radius of curvature R6 of an image-side surface of the third lens satisfy $-0.8 < R6/f3 < -0.3$.

In an implementation, a radius of curvature R1 of an object-side surface of the first lens and a radius of curvature R8 of an image-side surface of the fourth lens satisfy $0.2 < R8/R1 < 0.7$.

The present disclosure employs four lenses, and the optical imaging system has at least one advantageous effect such as miniaturization, high structural intensity, low stray light, good imaging quality, and the like by rationally configuring the refractive power, the surface shape, the center thickness of each lens, and the on-axis spaced interval between the lenses and the like.

BRIEF DESCRIPTION OF THE DRAWINGS

By describing non-limiting embodiments below in detail with reference to the accompanying drawings, other features, objectives and advantages of the present disclosure will be more apparent. In the accompanying drawings:

FIGS. 6A to 6D show a longitudinal aberration curve, an astigmatic curve, a distortion curve and a lateral color curve of, respectively, of the optical imaging system of Embodiment 2;

FIG. 7 is a schematic structural diagram of an optical imaging system according to Embodiment 3 of the present disclosure.

FIGS. 10A to 10D show a longitudinal aberration curve, an astigmatic curve, a distortion curve and a lateral color curve of, respectively, of the optical imaging system of Embodiment 4;

FIG. 11 is a schematic structural diagram of an optical imaging system according to Embodiment 5 of the present disclosure.

DETAILED DESCRIPTION OF EMBODIMENTS

Figure 1A:
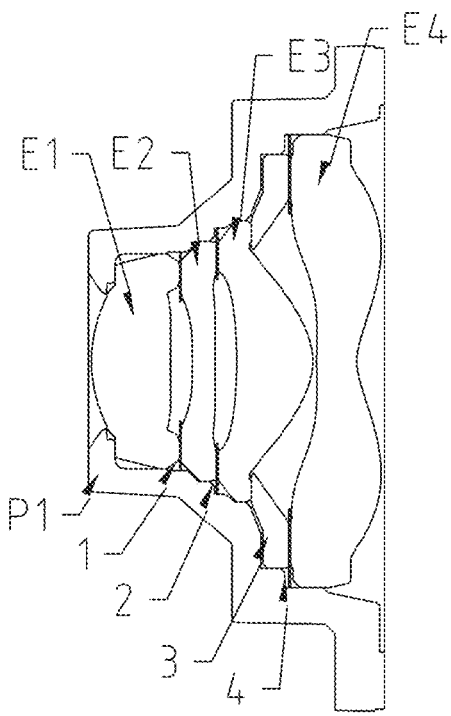
FIG. 1A is a schematic structural diagram illustrating an optical imaging system according to embodiments of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size, and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list.

Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

Referring to FIG. 1A, an optical imaging system according to an exemplary embodiment of the present disclosure includes an optical lens group. The optical lens group may include, for example, four lenses having refractive power, i.e., a first lens E1, a second lens E2, a third lens E3, and a fourth lens E4. The four lenses are arranged sequentially along the optical axis from the object side to the image side. In the first lens E1 to the fourth lens E4, there may be air spaces between any two adjacent lenses.

In an exemplary implementation, the first lens E1 may have a positive refractive power and the object-side surface thereof may be convex; the second lens E2 may have a negative refractive power; the third lens E3 may have a positive refractive power and the image-side surface thereof may be convex; the fourth lens E4 may have a negative refractive power and the image-side surface thereof may be concave. By reasonably controlling the distribution of the positive and negative refractive powers of the components of the system and the curvatures of the lens surfaces, it is advantageous to make the optical lens group small in size and ultra-thin in nature, thereby making the optical imaging system to have the characteristic of miniaturization. An embodiment of the present disclosure provides an optical imaging system that occupies less installation space when assembled to a device, facilitating lifting of the size of other components in the device, such as a screen.

In an exemplary implementation, an optical imaging system according to an exemplary implementation of the present disclosure further includes a lens barrel P1, the lens barrel is for accommodating an optical lens group.

In an exemplary implementation, the optical imaging system may include a plurality of spacers. The plurality of spacers may include, for example, a first spacer 1 disposed between the first lens E1 and the second lens E2, a second spacer 2 disposed between the second lens E2 and the third lens E3, and a third spacer 3 and a fourth spacer 4 disposed between the third lens E3 and the fourth lens E4. A larger number of spacers may also be provided between the third lens E3 and the fourth lens E4. Alternatively, the third spacer 3 is a metal spacer and the fourth spacer 4 is a plastic spacer. Alternatively, the third spacer 3 is a plastic spacer and the fourth spacer 4 is a metal spacer. By using the metal spacer and the plastic spacer in combination, the structural strength of the optical imaging system can be improved, and stray light in the optical imaging system can be reduced, thereby improving the imaging quality.

Figure 2:
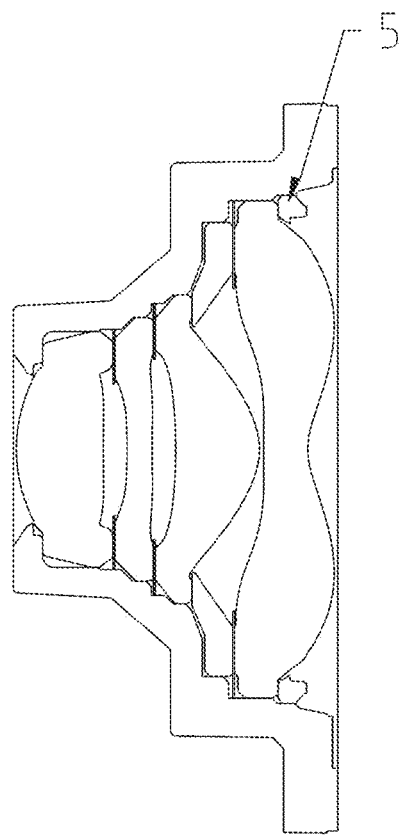
FIG. 2 is a schematic structural diagram of an optical imaging system according to another embodiment of the present disclosure.

Referring to FIG. 2, in an exemplary implementation, the optical imaging system of the present disclosure further includes a clamping ring 5, the clamping ring being disposed in the image-side direction of the fourth lens. By providing the clamping ring 5, the stability of the assembled optical imaging system can be improved, the yield of the optical imaging system can be improved, and the optical imaging system can be reliably applied to the imaging apparatus.

Figure 1B:
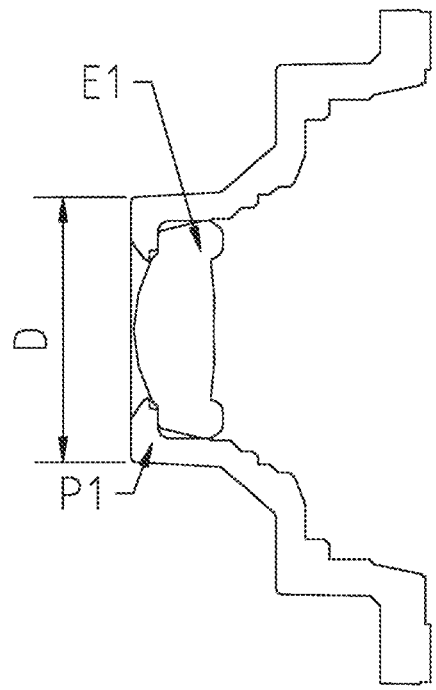
FIG. 1B is a schematic structural diagram illustrating the matching relationship between the first lens and the lens assembly according to FIG. 1A.

Referring to FIG. 1B, in an exemplary implementation, the optical imaging system of the present disclosure may satisfy the conditional expression $2 \times DT11/D \geq 0.5$, where D is the diameter of the lens barrel P1 at the end towards the object side, and DT11 is the maximum effective radius of the object-side surface of the first lens E1. More specifically, DT11 and D may satisfy the conditional expression $0.5 < 2 \times DT11/D < 2$. By controlling the optical imaging system to satisfy this conditional expression, it is advantageous to make the head portion of the lens barrel P1 to have a smaller size, so that the object-side end of the optical imaging system may have a smaller size. When the optical imaging system provided in the present disclosure is applied to a mobile phone, it is advantageous to make the mobile phone have a high screen ratio.

Figure 1C:
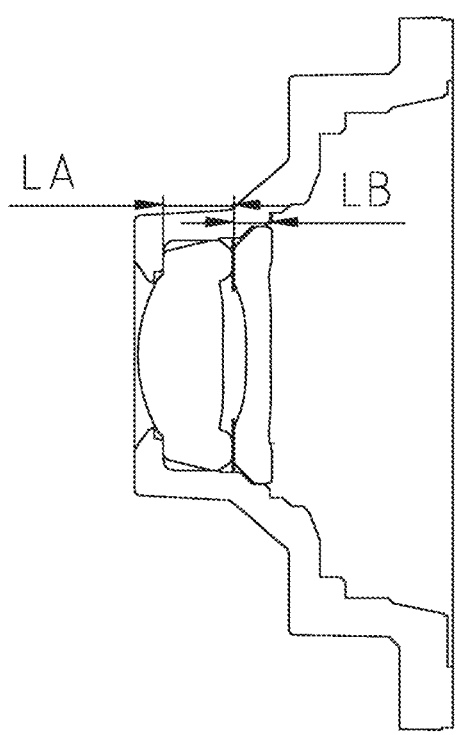
FIG. 1C is a schematic structural diagram of the first lens, the first spacer and the second lens according to an embodiment of the present disclosure.

Referring to FIGS. 1A and 1C, in an exemplary implementation, when the first spacer 1 is provided between the first lens E1 and the second lens E2, the optical imaging system of the present disclosure may satisfy the conditional expression $1.5 < LA/LB < 2.5$, where LA is a distance from the object-side bearing surface of the first lens E1 to the image-side bearing surface of the first lens E1, and LB is a distance from the object-side bearing surface of the second lens E2 to the image-side bearing surface of the second lens E2. Exemplarily, $1.52 < LA/LB < 2.22$. By controlling the ratio of the thickness of the bearing structure of the first lens E1 in the direction parallel to the optical axis to the thickness of the bearing structure of the second lens E2 in the direction parallel to the optical axis, it is advantageous to reduce the stress of the second lens E2, and to make the first spacer 1 close to the object-side surface of the second lens E2, thereby facilitating the reduction of stray light.

Figure 1D:
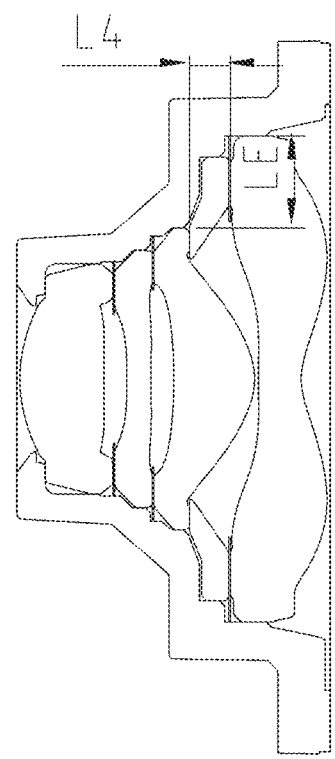
FIG. 1D is a schematic structural diagram of the third lens, the third spacer, the fourth spacer, and the fourth lens according to an embodiment of the present disclosure.

Referring to FIGS. 1A and 1D, in an exemplary implementation, the optical imaging system of the present disclosure may satisfy the conditional expression $LE \geq 0.5$ mm, and the conditional expression $L4 \geq 0.3$ mm, where LE is the difference between the effective radius of the third lens E3 and the effective radius of the fourth lens E4, and L4 is the distance between the image-side bearing surface of the third lens E3 and the object-side bearing surface of the fourth lens E4. Exemplarily, the optical imaging system of the present disclosure may satisfy the conditional expression $0.82$ mm $\leq LE \leq 1$ mm, $0.3$ mm $\leq L4 \leq 0.6$ mm. By controlling the distance between the bearing structure of the third lens E3 and the bearing structure of the fourth lens E4, it is advantageous to control the thickness of the spacer between the third lens E3 and the fourth lens E4. By controlling the effective radius of the third lens E3 and the effective radius of the fourth lens E4, it is advantageous to match the inner diameter of the spacer between the third lens E3 and the fourth lens E4 with the third lens E3 and the fourth lens E4. Exemplarily, when at least one metal spacer and at least one plastic spacer are provided between the third lens E3 and the fourth lens E4, the stability of the optical imaging system can be improved by controlling the thickness of the metal spacer, while the stray light can be shielded by controlling the thickness and the inner diameter size of the plastic spacer.

In an exemplary implementation, the optical imaging system of the present disclosure may satisfy the conditional expression $TTL/ImgH < 1.6$, where TTL is the axial distance from the object-side surface of the first lens E1 to the image plane of the optical imaging system, and ImgH is the half of a diagonal length of an effective pixel area on the image plane. More specifically, TTL and ImgH may satisfy $1.50 < TTL/ImgH < 1.59$. By controlling the ratio of the optical total length to the image height of the optical imaging system, it is advantageous for the optical imaging system to have ultra-thin characteristics.

In an exemplary implementation, the optical imaging system of the present disclosure may satisfy the conditional expression $DT11/ImgH < 0.3$, where DT11 is the maximum effective radius of the object-side surface of the first lens E1 and ImgH is half the diagonal length of the effective pixel area on the image plane. More specifically, DT11 and ImgH may satisfy $0.23 < DT11/ImgH < 0.29$. By controlling the ratio of the maximum effective radius of the object-side surface of the first lens E1 to the image height, it is advantageous to reduce the size of the object-side end of the optical imaging system. Exemplarily, by simultaneously controlling the ratio of the optical total length to the image height of the optical imaging system facilitates miniaturization of the optical imaging system. The optical imaging system provided in the present disclosure has a small mounting size, and can better meet market demands For example, the optical imaging system can be better applied to a full-screen mobile phone.

In an exemplary implementation, the optical imaging system of the present disclosure may satisfy the conditional expression $0.4<ET1/DT12<0.9$, where DT12 is the maximum effective radius of the image-side surface of the first lens E1, and ET1 is the edge thickness of the first lens E1. More specifically, DT12 and ET1 may satisfy $0.5<ET1/DT12<0.8$. By controlling the ratio of the edge thickness of the first lens E1 to the maximum effective radius of the image-side surface of the first lens E1, it is advantageous to make the first lens E1 to have a good processability, so that the first lens E1 can be easily processed and molded, and to make the first lens E1 have a good quality, thereby improving the imaging quality of the optical imaging system.

In an exemplary implementation, the optical imaging system of the present disclosure may satisfy the conditional expression $0.3<DT31/DT41<0.8$, where DT31 is the maximum effective radius of the object-side surface of the third lens E3, and DT41 is the maximum effective radius of the object-side surface of the fourth lens E4. More specifically, DT31 and DT41 may satisfy $0.4<DT31/DT41<0.6$. By matching the maximum effective radius of the object-side surface of the third lens E3 with the maximum effective radius of the object-side surface of the fourth lens E4, the range of incident light rays can be well limited, so that the light rays with poor quality in the marginal area can be eliminated, thereby reducing the off-axis aberration. At the same time, it is also advantageous to make the third lens E3 and the fourth lens E4 have good processability, improve the quality of the third lens E3 and the fourth lens E4, and further improve the resolution capability of the optical imaging system.

In an exemplary implementation, the optical imaging system of the present disclosure may satisfy the conditional expression $0.2<ET3/CT3<0.7$, where ET3 is the edge thickness of the third lens E3 and CT3 is the center thickness of the third lens E3 on the optical axis. More specifically, ET3 and CT3 may satisfy $0.3<ET3/CT3<0.5$. By matching the edge thickness of the third lens E3 with the center thickness of the third lens E3, it is advantageous to control the shape of the third lens E3 so as to have better processability, and to obtain the third lens E3 by means of molding, thereby enabling the optical imaging system to have better imaging quality.

In an exemplary implementation, the optical imaging system of the present disclosure may satisfy the conditional expression $0.4<CT4/ET4<0.9$, where CT4 is the center thickness of the fourth lens E4 on the optical axis and ET4 is the edge thickness of the fourth lens E4. More specifically, CT4 and ET4 may satisfy $0.52<CT4/ET4<0.79$. By matching the center thickness of the fourth lens E4 with the edge thickness of the fourth lens E4, the fourth lens E4 is advantageously made to have a good processability, and the molding of the fourth lens E4 is facilitated, thereby improving the image resolving power of the optical imaging system.

In an exemplary implementation, the optical imaging system of the present disclosure may satisfy the conditional expression $0.2<f3/f1<0.7$, where f1 is the effective focal length of the first lens E1 and f3 is the effective focal length of the third lens E3. More specifically, f1 and f3 may satisfy $0.36<f3/f1<0.63$. By controlling the ratio of the effective focal length of the third lens E3 to the effective focal length of the first lens E1, it is advantageous to reduce the contribution of the third lens E3 and the first lens E1 to the spherical aberration of the optical imaging system, so that the optical imaging system may have good imaging quality at on-axis field.

In an exemplary implementation, the optical imaging system of the present disclosure may satisfy the conditional expression $1.0<f/f2-f/f4<2.0$, where f is the total effective focal length of the optical imaging system, f2 is the effective focal length of the second lens E2, and f4 is the effective focal length of the fourth lens E4. More specifically, f, f2, and f4 may satisfy $1.2<f/f2-f/f4<1.9$. By matching the effective focal length of the second lens E2 and the effective focal length of the fourth lens E4 with the total effective focal length of the optical imaging system, it is advantageous to control the contribution of the second lens E2 and the fourth lens E4 to the spherical aberration of the optical imaging system, thereby enabling the optical imaging system to have a small spherical aberration, thereby improving the imaging quality at the off-axis field.

In an exemplary implementation, the optical imaging system of the present disclosure may satisfy the conditional expression $-0.8<R6/f3<-0.3$, where f3 is the effective focal length of the third lens E3 and R6 is the radius of curvature of the image-side surface of the third lens E3. More specifically, f3 and R6 may satisfy $-0.58<R6/f3<-0.43$. By controlling the ratio of the radius of curvature of the image-side surface of the third lens E3 to the effective focal length thereof, it is advantageous to control the astigmatism of the optical imaging system, thereby improving the imaging quality at the off-axis field.

In an exemplary implementation, the optical imaging system of the present disclosure may satisfy the conditional expression $0.2<R8/R1<0.7$, where R1 is the radius of curvature of the object-side surface of the first lens E1 and R8 is the radius of curvature of the image-side surface of the fourth lens E4. More specifically, R1 and R8 may satisfy $0.36<R8/R1<0.49$. By controlling the ratio of the radius of curvature of the image-side surface of the fourth lens E4 to the radius of curvature of the object-side surface of the first lens E1, it is advantageous to balance the aberration of the optical imaging system, thereby improving the quality of the optical imaging system.

In an exemplary implementation, the above-described optical imaging system may further include at least one diaphragm. The diaphragm may be disposed in an appropriate position as desired, for example, between the object side and the first lens E1. Alternatively, the above-described optical imaging system may further comprise a filter for correcting color deviations and/or a protective glass for protecting the photosensitive element located on the image plane.

The optical imaging system according to the above implementations of the present disclosure may employ a plurality of lenses, such as four lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical properties such as large aperture, large image plane, high pixels, high image quality, and miniaturization.

In an implementations of the present disclosure, at least one of the surfaces of lenses is aspheric, that is, at least one of the object-side surface of the first lens to the image-side surface of the fourth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Alternatively, the object-side surfaces of the first lens E1, the second lens E2, the third lens E3, the fourth lens E4 are aspheric surfaces. Alternatively, the object-side surface and image-side surface of the third lens E3 and the fourth lens E4 are aspheric surfaces. Alternatively, the object-side surface and image-side surface of any one of the second lens E2, the third lens E3 and the fourth lens E4 are aspheric surfaces.

However, it will be understood by those skilled in the art that the number of lenses constituting the optical imaging system may be varied to achieve the various results and advantages described in this specification without departing from the technical solution claimed by the present disclosure. For example, although the embodiment is described by taking seven lenses as an example, the optical imaging system is not limited to include seven lenses. The optical imaging system may also include other numbers of lenses if desired.

Some specific embodiments of an optical imaging system applicable to the above implementations will be further described below with reference to the accompanying drawings.

Embodiment 1

Figure 3:
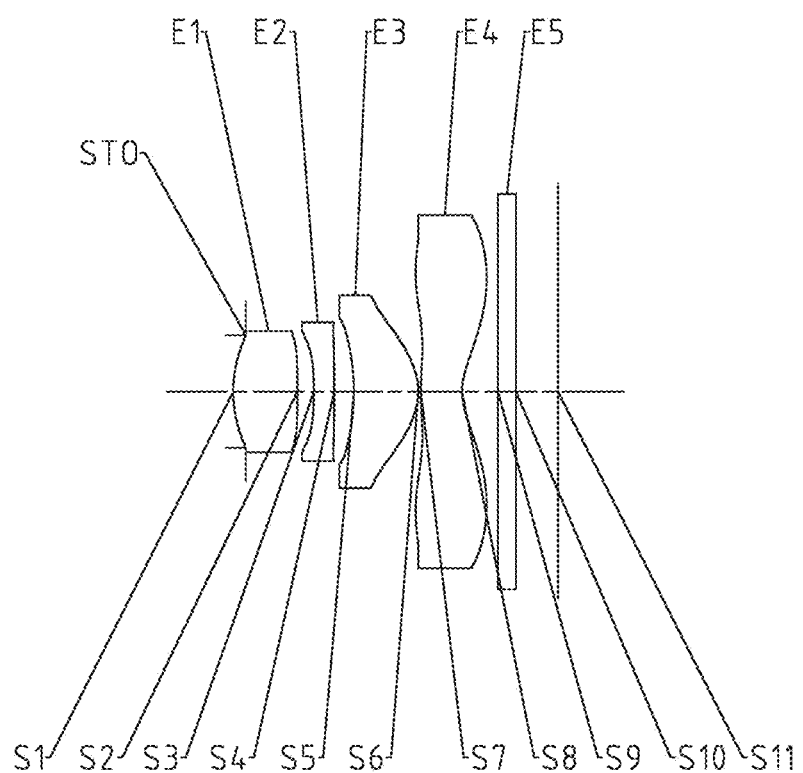
FIG. 3 is a schematic structural diagram of an optical imaging system according to Embodiment 1 of the present disclosure.

An optical imaging system according to embodiment 1 of the present disclosure is described below with reference to FIG. 3 to FIG. 4D. FIG. 3 shows a schematic structural diagram of the optical imaging system according to Embodiment 1 of the present disclosure.

As shown in FIG. 1, the optical imaging system sequentially includes, along the optical axis from the object side to the image side, a diaphragm STO, a first lens E1, a second lens E2, a third lens E3, a fourth lens E4, and an optical filter E5.

The first lens E1 has a positive refractive power, the object-side surface S1 of the first lens E1 is a convex surface, and the image-side surface S2 of the first lens E1 is a concave surface. The second lens E2 may have a negative refractive power, the object-side surface S3 of the second lens E2 is a concave surface, and the image-side surface S4 of the second lens E2 is a convex surface. The third lens E3 has a positive refractive power, the object-side surface S5 of the third lens E3 is a concave surface, and the image-side surface S6 of the third lens E3 is a convex surface. The fourth lens E4 has a negative refractive power, the object-side surface S7 of the fourth lens E4 is a concave surface, and the image-side surface S8 of the fourth lens E4 is a concave surface. The optical filter E5 has the object-side surface S9 and the image-side surface S10. The optical imaging system has the image plane S11, and light from an object sequentially passes through the respective surfaces S1 to S10 and is finally imaged on the image plane S11.

The optical imaging system of this embodiment may also include a lens barrel. The lens barrel is used to accommodate the first lens E1, the second lens E2, the third lens E3, the fourth lens E4, and the filter E5. Each of the first lens E1, the second lens E2, the third lens E3, the fourth lens E4, and the filter E5 has an object-side bearing surface and an image-side bearing surface, respectively, where spacers may be provided between adjacent lenses. Table 1 is a table illustrating basic parameters of the optical imaging system of Embodiment 1, where the units for the radius of curvature, the thickness/distance and the focal length are millimeter (mm).

TABLE 1

| Surface Number | Surface Type | Radius of Curvature | Thickness/Distance | Material Refractive Index | Abbe Number | Focal Length | Conic Coefficient |
|---|---|---|---|---|---|---|---|
| OBJ | spherical | Infinite | 400.0000 | | | | |
| STO | spherical | Infinite | −0.1460 | | | | |
| S1 | aspheric | 1.4654 | 0.7466 | 1.55 | 56.1 | 2.70 | 0.0000 |
| S2 | aspheric | 240.0000 | 0.1924 | | | | 0.0000 |
| S3 | aspheric | −4.4202 | 0.2357 | 1.67 | 20.4 | −6.70 | −43.8420 |
| S4 | aspheric | −541.5728 | 0.2301 | | | | −99.0000 |
| S5 | aspheric | −2.4093 | 0.7491 | 1.55 | 56.1 | 1.61 | 2.7366 |
| S6 | aspheric | −0.7138 | 0.0300 | | | | −0.9001 |
| S7 | aspheric | 3.1811 | 0.4786 | 1.55 | 56.1 | −1.68 | −23.8952 |
| S8 | aspheric | 0.6750 | 0.4184 | | | | −4.9222 |
| S9 | spherical | Infinite | 0.2100 | 1.52 | 64.2 | | |
| S10 | spherical | Infinite | 0.4890 | | | | |
| S11 | spherical | Infinite | | | | | |

In Embodiment 1, the value of the total effective focal length f of the optical imaging system is 2.73 mm, the value of the axial distance TTL from the object-side surface S1 of the first lens E1 to the image plane S11 is 3.78 mm, the value of half the diagonal length ImgH of the effective pixel area on the image plane S11 is 2.42 mm, and the value of half of a maximal field-of-view Semi-FOV is 40.9°.

In Embodiment 1, the object-side surface and image-side surface of any one of the first lenses E1 to the fourth lens E4 are aspherical, and the surface type x of each aspheric surface is defined by the following formula:

$$x = \frac{ch^2}{1+\sqrt{1-(k+1)c^2h^2}} + \sum A_i h^i \qquad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 2 above); and Ai is the correction coefficient of the $i^{th}$ order of the aspheric surface. Table 2 below shows the high-order coefficients A4, A6, A8, A10, A12, A14, A16, A18 and A20 applicable to the aspheric surfaces S1-S10 of the aspheric lenses in the present embodiment.

TABLE 2

| Surface Number | A4 | A6 | A8 | A10 | A12 | A14 | A16 | A18 | A20 |
|---|---|---|---|---|---|---|---|---|---|
| S1 | −1.1250E−02 | −1.9449E−01 | 1.7430E+00 | −1.0179E+01 | 2.6746E+01 | −6.4850E−01 | −1.7396E+02 | 3.8731E+02 | −2.7453E+02 |
| S2 | −1.8317E−01 | −1.0430E+00 | 1.2653E+01 | −1.0361E+02 | 5.0002E+02 | −1.4759E+03 | 2.6338E+03 | −2.6106E+03 | 1.1045E+03 |
| S3 | −4.1180E−01 | 1.9413E−01 | −4.3117E+00 | 3.2612E+01 | −1.4647E+02 | 4.1262E+02 | −6.7359E+02 | 5.7738E+02 | −1.9775E+02 |
| S4 | −3.7143E−02 | −4.4712E−01 | 3.4963E+00 | −1.7213E+01 | 5.9529E+01 | −1.3492E+02 | 1.9225E+02 | −1.5662E+02 | 5.5589E+01 |
| S5 | 1.4094E−01 | −2.9466E−01 | −2.9957E−01 | 5.5695E+00 | −2.1718E+01 | 4.8452E+01 | −6.8547E+01 | 5.7189E+01 | −2.1785E+01 |
| S6 | 5.9356E−01 | −1.6599E+00 | 4.6257E+00 | −9.6537E+00 | 1.4121E+01 | −1.3560E+01 | 8.2664E+00 | −2.9685E+00 | 4.8398E−01 |
| S7 | −3.6287E−01 | 4.4986E−01 | −4.5568E−01 | 3.9587E−01 | −2.4150E−01 | 9.4774E−02 | −2.2806E−02 | 3.0703E−03 | −1.7741E−04 |
| S8 | −2.1672E−01 | 2.3025E−01 | −1.9984E−01 | 1.2529E−01 | −5.4682E−02 | 1.6039E−02 | −2.9883E−03 | 3.1730E−04 | −1.4555E−05 |

Figure 4A:
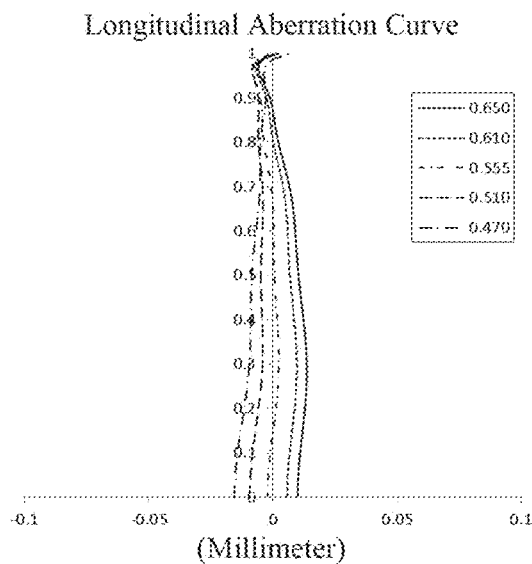
FIGS. 4A to 4D show a longitudinal aberration curve, an astigmatic curve, a distortion curve and a lateral color curve of, respectively, of the optical imaging system of Embodiment 1.
Figure 4B:
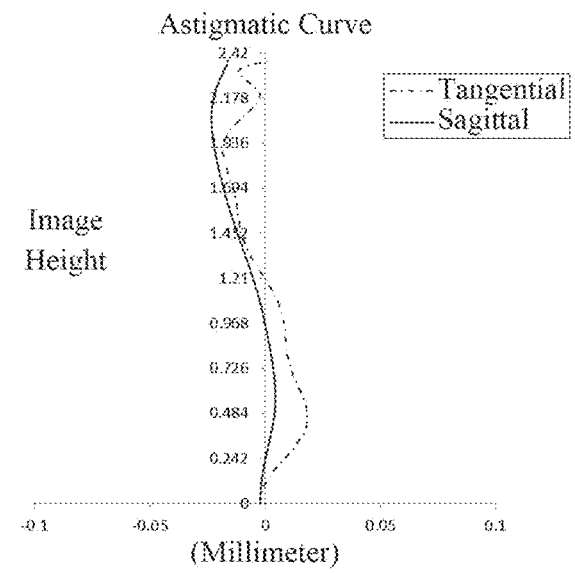
Figure 4C:
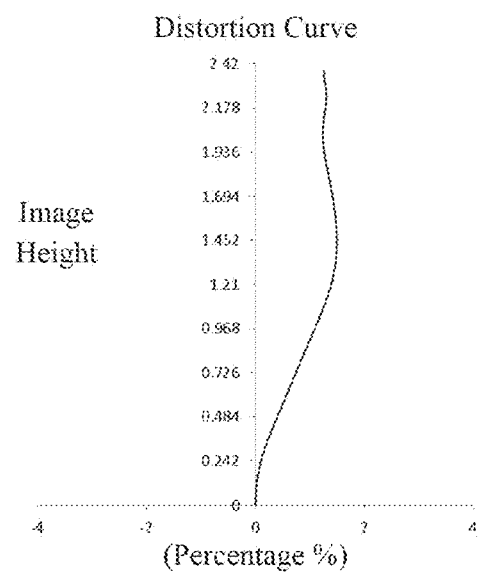
Figure 4D:
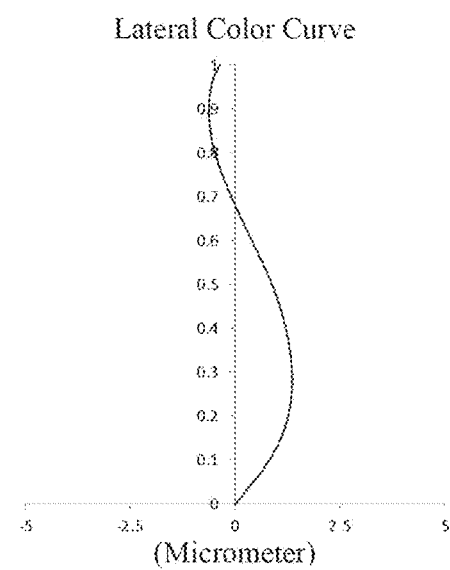

FIG. 4A illustrates a longitudinal aberration curve of the optical imaging system according to Embodiment 1, representing deviations of focal points converged by light of different wavelengths after passing through the optical imaging system. FIG. 4B illustrates an astigmatic curve of the optical imaging system according to Embodiment 1, representing a curvature of a tangential plane and a curvature of a sagittal plane. FIG. 4C illustrates a distortion curve of the optical imaging system according to Embodiment 1, representing amounts of distortion at different image heights. FIG. 4D illustrates a lateral color curve of the optical imaging system according to Embodiment 1, representing deviations of different image heights on the imaging plane after light passes through the optical imaging system. It can be seen from FIG. 4A to FIG. 4D that the optical imaging system provided in Embodiment 1 may achieve good imaging quality.

Embodiment 2

Figure 5:
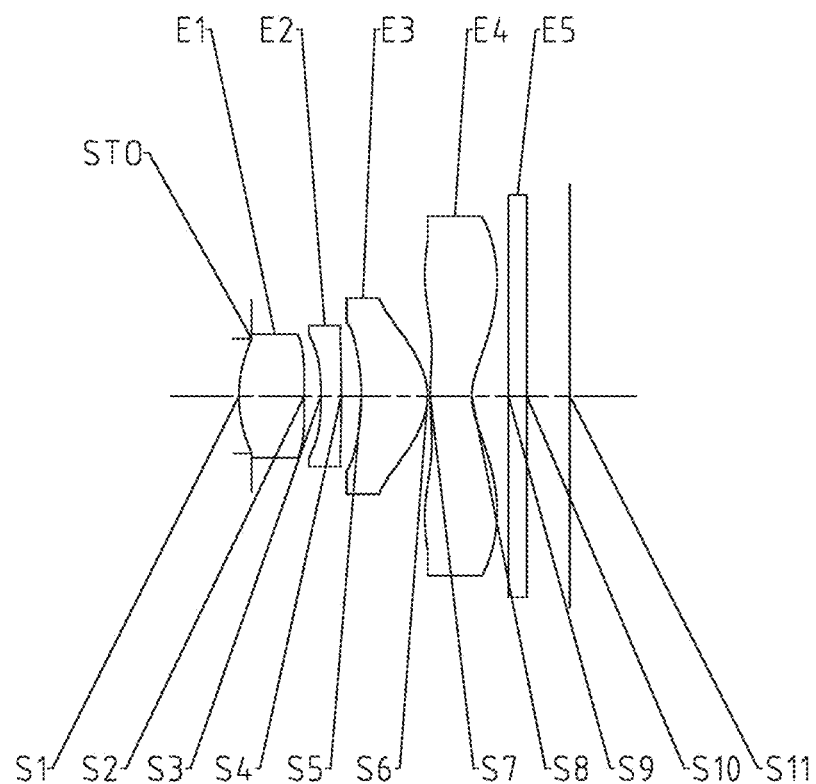
FIG. 5 is a schematic structural diagram of an optical imaging system according to Embodiment 2 of the present disclosure.

An optical imaging system according to Embodiment 2 of the present disclosure is described below with reference to FIGS. 5 to 6D. In the present embodiment and the following embodiments, the description similar to embodiment 1 will be omitted for brevity. FIG. 5 shows a schematic structural diagram of an optical imaging system according to embodiment 2 of the present disclosure.

As shown in FIG. 5, the optical imaging system sequentially includes, along the optical axis from an object side to an image side, an diaphragm STO, a first lens E1, a second lens E2, a third lens E3, a fourth lens E4, and an optical filter E5.

The first lens E1 has a positive refractive power, the object-side surface S1 of the first lens E1 is a convex surface, and the image-side surface S2 of the first lens E1 is a convex surface. The second lens E2 may have a negative refractive power, the object-side surface S3 of the second lens E2 is a concave surface, and the image-side surface S4 of the second lens E2 is a convex surface. The third lens E3 has a positive refractive power, the object-side surface S5 of the third lens E3 is a concave surface, and the image-side surface S6 of the third lens E3 is a convex surface. The fourth lens E4 has a negative refractive power, the object-side surface S7 of the fourth lens E4 is a convex surface, and the image-side surface S8 of the fourth lens E4 is a concave surface. The optical filter E5 has the object-side surface S9 and the image-side surface S10. The optical imaging system has the image plane S11, and light from an object sequentially passes through the respective surfaces S1 to S10 and is finally imaged on the image plane S11.

The optical imaging system of this embodiment may also include a lens barrel. The lens barrel is used to accommodate the first lens E1, the second lens E2, the third lens E3, the fourth lens E4, and the filter E5. Each of the first lens E1, the second lens E2, the third lens E3, the fourth lens E4, and the filter E5 has an object-side bearing surface and an image-side bearing surface, respectively, where spacers may be provided between adjacent lenses.

In Embodiment 2, the value of the total effective focal length f of the optical imaging system is 2.68 mm, the value of the axial distance TTL from the object-side surface S1 of the first lens E1 to the image plane S11 is 3.78 mm, the value of half the diagonal length ImgH of the effective pixel area on the image plane S11 is 2.42 mm, and the value of half of a maximal field-of-view Semi-FOV is 40.9°.

Table 3 below is a table illustrating basic parameters of the optical imaging system of Embodiment 2, where the units for the radius of curvature, the thickness/distance and the focal length are millimeter (mm). Table 4 below shows the high-order coefficients applicable to the aspheric surfaces in the Embodiment 2, where the surface type of each aspheric surface is defined by the formula (1) given in the above Embodiment 1.

TABLE 3

| Surface Number | Surface Type | Radius of Curvature | Thickness/ Distance | Refractive Index | Abbe Number | Focal Length | Conic Coefficient |
|---|---|---|---|---|---|---|---|
| OBJ | spherical | Infinite | 400.0000 | | | | |
| STO | spherical | Infinite | −0.1454 | | | | |
| S1 | aspheric | 1.4679 | 0.7464 | 1.55 | 56.1 | 2.68 | 0.0000 |
| S2 | aspheric | −500.0000 | 0.1915 | | | | 0.0000 |
| S3 | aspheric | −4.1753 | 0.2309 | 1.67 | 20.4 | −6.65 | −45.9420 |
| S4 | aspheric | −75.5084 | 0.2311 | | | | −99.0000 |
| S5 | aspheric | −2.4084 | 0.7565 | 1.55 | 56.1 | 1.58 | 2.9022 |
| S6 | aspheric | −0.7069 | 0.0300 | | | | −0.9023 |
| S7 | aspheric | 3.2354 | 0.4740 | 1.55 | 56.1 | −1.65 | −21.9879 |
| S8 | aspheric | 0.6694 | 0.4195 | | | | −4.9413 |
| S9 | spherical | Infinite | 0.2100 | 1.52 | 64.2 | | |
| S10 | spherical | Infinite | 0.4901 | | | | |
| S11 | spherical | Infinite | | | | | |

TABLE 4

| Surface Number | A4 | A6 | A8 | A10 | A12 | A14 | A16 | A18 | A20 |
|---|---|---|---|---|---|---|---|---|---|
| S1 | −1.1334E−02 | −1.9665E−01 | 1.7689E+00 | −1.0368E+01 | 2.7344E+01 | −6.6545E−01 | −1.7917E+02 | 4.0038E+02 | −2.8484E+02 |
| S2 | −1.8269E−01 | −1.0389E+00 | 1.2587E+01 | −1.0293E+02 | 4.9610E+02 | −1.4624E+03 | 2.6062E+03 | −2.5800E+03 | 1.0901E+03 |
| S3 | −4.1786E−01 | 2.6049E−01 | −4.6591E+00 | 3.4354E+01 | −1.5275E+02 | 4.2783E+02 | −6.9785E+02 | 6.0047E+02 | −2.0754E+02 |
| S4 | −3.0945E−02 | −3.9126E−01 | 3.0912E+00 | −1.5319E+01 | 5.3514E+01 | −1.2253E+02 | 1.7657E+02 | −1.4567E+02 | 5.2399E+01 |
| S5 | 1.3234E−01 | −2.1581E−01 | −7.1281E−01 | 6.8809E+00 | −2.4342E+01 | 5.1371E+01 | −6.9750E+01 | 5.6711E+01 | −2.1395E+01 |
| S6 | 6.3175E−01 | −1.8170E+00 | 5.1230E+00 | −1.0852E+01 | 1.6148E+01 | −1.5885E+01 | 9.9606E+00 | −3.6619E+00 | 6.0404E−01 |
| S7 | −3.5783E−01 | 4.3261E−01 | −4.3354E−01 | 3.7636E−01 | −2.2898E−01 | 8.9309E−02 | −2.1302E−02 | 2.8379E−03 | −1.6210E−04 |
| S8 | −2.1223E−01 | 2.2278E−01 | −1.9300E−01 | 1.2142E−01 | −5.3353E−02 | 1.5794E−02 | −2.9766E−03 | 3.2043E−04 | −1.4938E−05 |

Figure 6A:
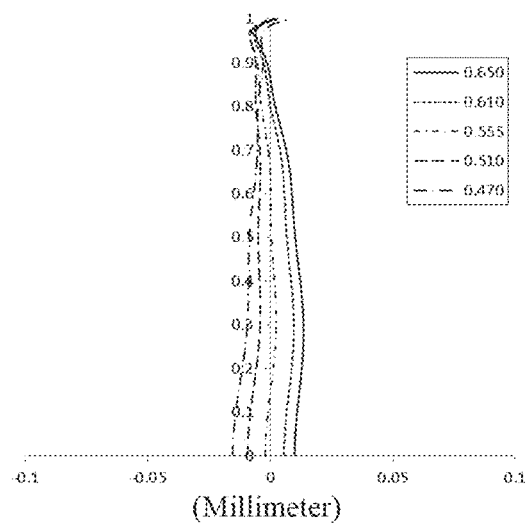
Figure 6B:
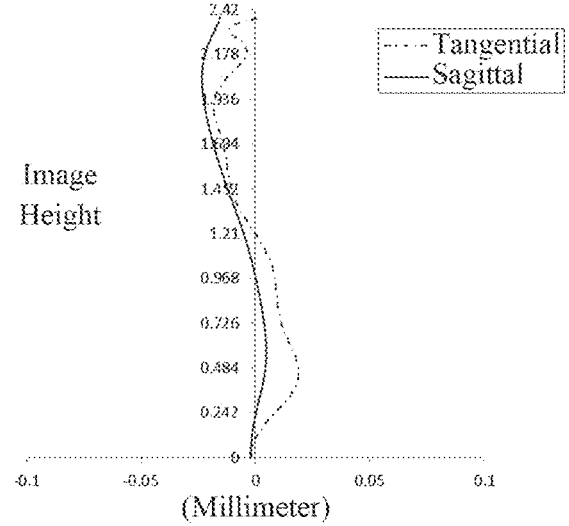

FIG. 6A illustrates a longitudinal aberration curve of the optical imaging system according to Embodiment 2, representing deviations of focal points converged by light of different wavelengths after passing through the optical imaging system. FIG. 6B illustrates an astigmatic curve of the optical imaging system according to Embodiment 2, representing a curvature of a tangential plane and a curvature of a sagittal plane. FIG. 6C illustrates a distortion curve of the optical imaging system according to Embodiment 2, representing amounts of distortion at different image heights. FIG. 6D illustrates a lateral color curve of the optical imaging system according to Embodiment 2, representing deviations of different image heights on the imaging plane after light passes through the optical imaging system. It can be seen from FIG. 6A to FIG. 6D that the optical imaging system provided in Embodiment 2 may achieve good imaging quality.

Embodiment 3

An optical imaging system according to Embodiment 3 of the present disclosure is described below with reference to FIGS. 7 to 8D. FIG. 7 shows a schematic structural diagram of an optical imaging system according to embodiment 3 of the present disclosure.

As shown in FIG. 7, the optical imaging system sequentially includes, along the optical axis from an object side to an image side, an diaphragm STO, a first lens E1, a second lens E2, a third lens E3, a fourth lens E4, and an optical filter E5.

The first lens E1 has a positive refractive power, the object-side surface S1 of the first lens E1 is a convex surface, and the image-side surface S2 of the first lens E1 is a convex surface. The second lens E2 may have a negative refractive power, the object-side surface S3 of the second lens E2 is a concave surface, and the image-side surface S4 of the second lens E2 is a concave surface. The third lens E3 has a positive refractive power, the object-side surface S5 of the third lens E3 is a concave surface, and the image-side surface S6 of the third lens E3 is a convex surface. The fourth lens E4 has a negative refractive power, the object-side surface S7 of the fourth lens E4 is a convex surface, and the image-side surface S8 of the fourth lens E4 is a concave surface. The optical filter E5 has the object-side surface S9 and the image-side surface S10. The optical imaging system has the image plane S11, and light from an object sequentially passes through the respective surfaces S1 to S10 and is finally imaged on the image plane S11.

The optical imaging system of this embodiment may also include a lens barrel. The lens barrel is used to accommodate the first lens E1, the second lens E2, the third lens E3, the fourth lens E4, and the filter E5. Each of the first lens E1, the second lens E2, the third lens E3, the fourth lens E4, and the filter E5 has an object-side bearing surface and an image-side bearing surface, respectively, where spacers may be provided between adjacent lenses.

In Embodiment 3, the value of the total effective focal length f of the optical imaging system is 2.73 mm, the value of the axial distance TTL from the object-side surface S1 of the first lens E1 to the image plane S11 is 3.78 mm, the value of half the diagonal length ImgH of the effective pixel area on the image plane S11 is 2.42 mm, and the value of half of a maximal field-of-view Semi-FOV is 40.9°.

Table 5 below is a table illustrating basic parameters of the optical imaging system of Embodiment 3, where the units for the radius of curvature, the thickness/distance and the focal length are millimeter (mm). Table 6 below shows the high-order coefficients applicable to the aspheric surfaces in the Embodiment 3, where the surface type of each aspheric surface is defined by the formula (1) given in the above Embodiment 1.

TABLE 5

| Surface Number | Surface Type | Radius of Curvature | Thickness/ Distance | Material | | Focal Length | Conic Coefficient |
| | | | | Refractive Index | Abbe Number | | |
|---|---|---|---|---|---|---|---|
| OBJ | spherical | Infinite | 400.0000 | | | | |
| STO | spherical | Infinite | −0.1443 | | | | |
| S1 | aspheric | 1.4728 | 0.7433 | 1.55 | 56.1 | 2.69 | 0.0000 |
| S2 | aspheric | −500.0000 | 0.1895 | | | | 0.0000 |
| S3 | aspheric | −4.4464 | 0.2352 | 1.67 | 20.4 | −6.64 | −45.7953 |
| S4 | aspheric | 800.0000 | 0.2315 | | | | 99.0000 |
| S5 | aspheric | −2.3858 | 0.7523 | 1.55 | 56.1 | 1.60 | 2.6803 |
| S6 | aspheric | −0.7118 | 0.0300 | | | | −0.9006 |
| S7 | aspheric | 3.1105 | 0.4775 | 1.55 | 56.1 | −1.69 | −24.0026 |
| S8 | aspheric | 0.6717 | 0.4201 | | | | −4.9005 |
| S9 | spherical | Infinite | 0.2100 | 1.52 | 64.2 | | |

TABLE 5-continued

| | | | | Material | | | |
|---|---|---|---|---|---|---|---|
| Surface Number | Surface Type | Radius of Curvature | Thickness/ Distance | Refractive Index | Abbe Number | Focal Length | Conic Coefficient |
| S10 | spherical | Infinite | 0.4907 | | | | |
| S11 | spherical | Infinite | | | | | |

TABLE 6

| Surface Number | A4 | A6 | A8 | A10 | A12 | A14 | A16 | A18 | A20 |
|---|---|---|---|---|---|---|---|---|---|
| S1 | −1.1395E−02 | −1.9826E−01 | 1.7882E+00 | −1.0510E+01 | 2.7793E+01 | −6.7821E−01 | −1.8310E+02 | 4.1027E+02 | −2.9267E+02 |
| S2 | −1.8370E−01 | −1.0475E+00 | 1.2727E+01 | −1.0436E+02 | 5.0438E+02 | −1.4910E+03 | 2.6644E+03 | 2.6449E+03 | 1.1206E+03 |
| S3 | −4.0849E−01 | 2.4827E−01 | −4.8419E+00 | 3.5596E+01 | −1.5808E+02 | 4.4130E+02 | −7.1583E+02 | 6.1112E+02 | −2.0886E+02 |
| S4 | −3.4677E−02 | −3.6575E−01 | 2.8887E+00 | −1.4515E+01 | 5.1162E+01 | −1.1801E+02 | 1.7119E+02 | −1.4193E+02 | 5.1185E+01 |
| S5 | 1.3854E−01 | −2.6649E−01 | −3.2472E−01 | 5.3612E+00 | −2.0632E+01 | 4.5512E+01 | −6.4010E+01 | 5.3515E+01 | −2.0591E+01 |
| S6 | 5.9691E−01 | −1.6770E+00 | 4.7045E+00 | −9.8938E+00 | 1.4589E+01 | −1.4157E+01 | 8.7362E+00 | −3.1688E+00 | 5.1911E−01 |
| S7 | −3.5578E−01 | 4.4568E−01 | −4.6048E−01 | 4.0108E−01 | −2.4223E−01 | 9.3706E−02 | −2.2189E−02 | 2.9373E−03 | −1.6687E−04 |
| S8 | −2.1483E−01 | 2.2934E−01 | −2.0125E−01 | 1.2782E−01 | −5.6624E−02 | 1.6898E−02 | −3.2124E−03 | 3.4923E−04 | −1.6460E−05 |

Figure 8A:
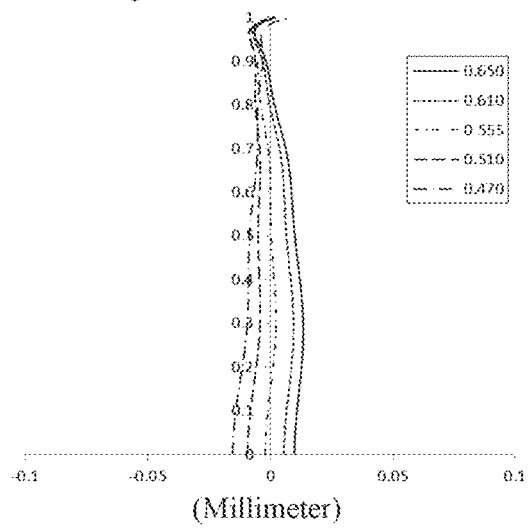
FIGS. 8A to 8D show a longitudinal aberration curve, an astigmatic curve, a distortion curve and a lateral color curve of, respectively, of the optical imaging system of Embodiment 3.
Figure 8B:
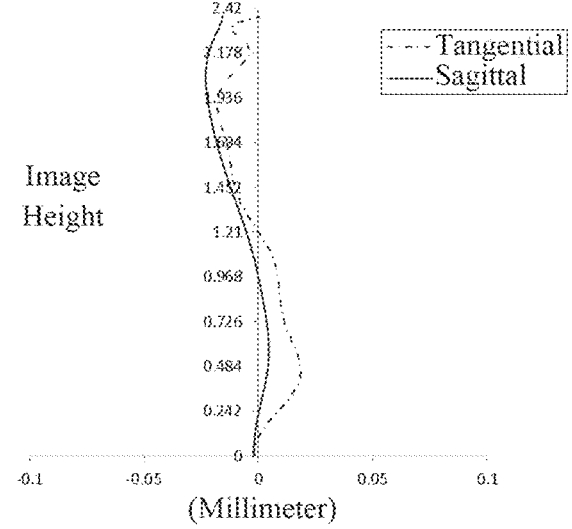
Figure 8C:
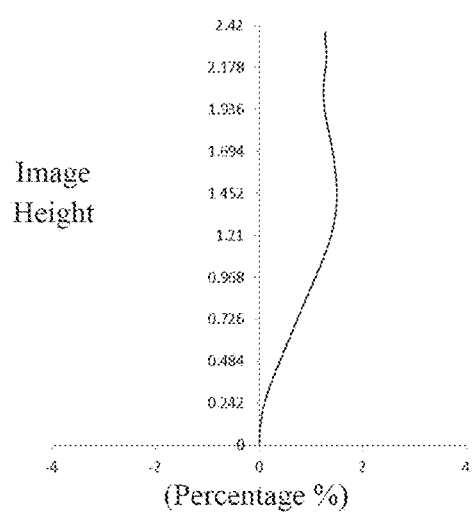
Figure 8D:
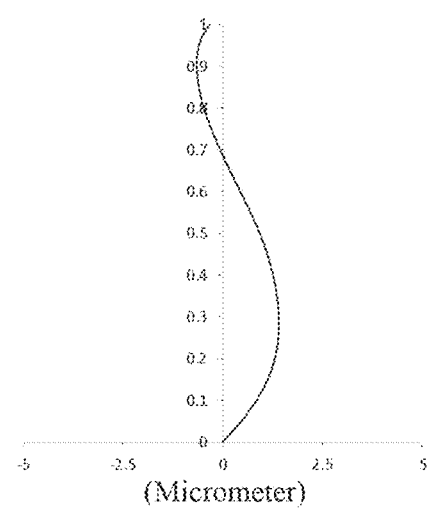

FIG. 8A illustrates a longitudinal aberration curve of the optical imaging system according to Embodiment 3, representing deviations of focal points converged by light of different wavelengths after passing through the optical imaging system. FIG. 8B illustrates an astigmatic curve of the optical imaging system according to Embodiment 3, representing a curvature of a tangential plane and a curvature of a sagittal plane. FIG. 8C illustrates a distortion curve of the optical imaging system according to Embodiment 3, representing amounts of distortion at different image heights. FIG. 8D illustrates a lateral color curve of the optical imaging system according to Embodiment 3, representing deviations of different image heights on the imaging plane after light passes through the optical imaging system. It can be seen from FIG. 8A to FIG. 8D that the optical imaging system provided in Embodiment 1 may achieve good imaging quality.

Embodiment 4

Figure 9:
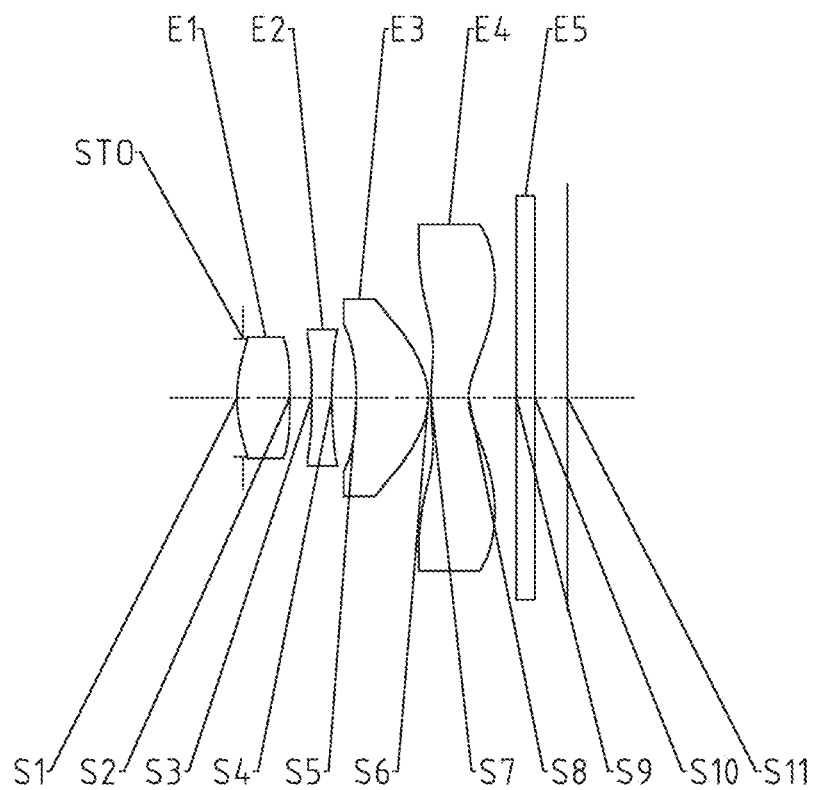
FIG. 9 is a schematic structural diagram of an optical imaging system according to Embodiment 4 of the present disclosure.

An optical imaging system according to Embodiment 4 of the present disclosure is described below with reference to FIGS. 9 to 10D. FIG. 9 shows a schematic structural diagram of an optical imaging system according to embodiment 4 of the present disclosure.

As shown in FIG. 9, the optical imaging system sequentially includes, along the optical axis from an object side to an image side, an diaphragm STO, a first lens E1, a second lens E2, a third lens E3, a fourth lens E4, and an optical filter E5.

The first lens E1 has a positive refractive power, the object-side surface S1 of the first lens E1 is a convex surface, and the image-side surface S2 of the first lens E1 is a convex surface. The second lens E2 may have a negative refractive power, the object-side surface S3 of the second lens E2 is a convex surface, and the image-side surface S4 of the second lens E2 is a concave surface. The third lens E3 has a positive refractive power, the object-side surface S5 of the third lens E3 is a concave surface, and the image-side surface S6 of the third lens E3 is a convex surface. The fourth lens E4 has a negative refractive power, the object-side surface S7 of the fourth lens E4 is a convex surface, and the image-side surface S8 of the fourth lens E4 is a concave surface. The optical filter E5 has the object-side surface S9 and the image-side surface S10. The optical imaging system has the image plane S11, and light from an object sequentially passes through the respective surfaces S1 to S10 and is finally imaged on the image plane S11.

The optical imaging system of this embodiment may also include a lens barrel. The lens barrel is used to accommodate the first lens E1, the second lens E2, the third lens E3, the fourth lens E4, and the filter E5. Each of the first lens E1, the second lens E2, the third lens E3, the fourth lens E4, and the filter E5 has an object-side bearing surface and an image-side bearing surface, respectively, where spacers may be provided between adjacent lenses.

In Embodiment 4, the value of the total effective focal length f of the optical imaging system is 2.79 mm, the value of the axial distance TTL from the object-side surface S1 of the first lens E1 to the image plane S11 is 3.78 mm, the value of half the diagonal length ImgH of the effective pixel area on the image plane S11 is 2.42 mm, and the value of half of a maximal field-of-view Semi-FOV is 40.4°.

Table 7 below is a table illustrating basic parameters of the optical imaging system of Embodiment 4, where the units for the radius of curvature, the thickness/distance and the focal length are millimeter (mm). Table 8 below shows the high-order coefficients applicable to the aspheric surfaces in the Embodiment 4, where the surface type of each aspheric surface is defined by the formula (1) given in the above Embodiment 1.

TABLE 7

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | 400.0000 | | | | |
| STO | spherical | Infinite | −0.0718 | | | | |
| S1 | aspheric | 1.6345 | 0.6040 | 1.55 | 56.1 | 2.73 | 0.0000 |
| S2 | aspheric | −14.9384 | 0.2492 | | | | 0.0000 |
| S3 | aspheric | 74.4504 | 0.2300 | 1.67 | 20.4 | −6.23 | 0.0000 |
| S4 | aspheric | 3.9219 | 0.2830 | | | | 16.8661 |
| S5 | aspheric | −3.3586 | 0.8210 | 1.55 | 56.1 | 1.55 | 9.5950 |
| S6 | aspheric | −0.7329 | 0.0300 | | | | −1.0000 |
| S7 | aspheric | 2.7200 | 0.4308 | 1.55 | 56.1 | −1.57 | 0.0000 |
| S8 | aspheric | 0.6157 | 0.5459 | | | | −4.4314 |
| S9 | spherical | Infinite | 0.2100 | 1.52 | 64.2 | | |
| S10 | spherical | Infinite | 0.3716 | | | | |
| S11 | spherical | Infinite | | | | | |

TABLE 8

| Surface Number | A4 | A6 | A8 | A10 | A12 | A14 | A16 | A18 | A20 |
|---|---|---|---|---|---|---|---|---|---|
| S1 | −7.1840E−02 | 3.2294E−01 | −6.4953E+00 | 5.8200E+01 | −3.1842E+02 | 1.0644E+03 | −2.1286E+03 | 2.3363E+03 | −1.0821E+03 |
| S2 | −2.3279E−01 | −3.6678E−01 | 6.0063E+00 | −5.6716E+01 | 3.0450E+02 | −9.7030E+02 | 1.8224E+03 | −1.8648E+03 | 8.0184E+02 |
| S3 | −3.9331E−01 | 4.6935E−01 | −2.6373E+00 | 1.7113E+01 | −5.9003E+01 | 1.3533E+02 | −2.0485E+02 | 1.8235E+02 | −7.1497E+01 |
| S4 | −2.3610E−01 | 4.3840E−01 | −3.4561E+00 | 2.3156E+01 | −8.8628E+01 | 2.1337E+02 | −3.1510E+02 | 2.5874E+02 | −9.0032E+01 |
| S5 | 9.4432E−02 | −2.4450E−01 | −6.9304E−02 | −3.4803E+00 | 2.8901E+01 | −9.3488E+01 | 1.5658E+02 | −1.3420E+02 | 4.6362E+01 |
| S6 | 7.6218E−01 | −2.5214E+00 | 7.0147E+00 | −1.5154E+01 | 2.3535E+01 | −2.4858E+01 | 1.6818E+01 | −6.5094E+00 | 1.0852E+00 |
| S7 | −4.3252E−01 | 2.3437E−01 | 1.0013E−02 | −8.6510E−02 | 5.4692E−02 | −1.2903E−02 | −1.4746E−03 | 1.2591E−03 | −1.6513E−04 |
| S8 | −2.3096E−01 | 2.0909E−01 | −1.4778E−01 | 7.5590E−02 | −2.6606E−02 | 5.8399E−03 | −6.3677E−04 | 4.8036E−06 | 3.5313E−06 |

Figures 10A, 10B:
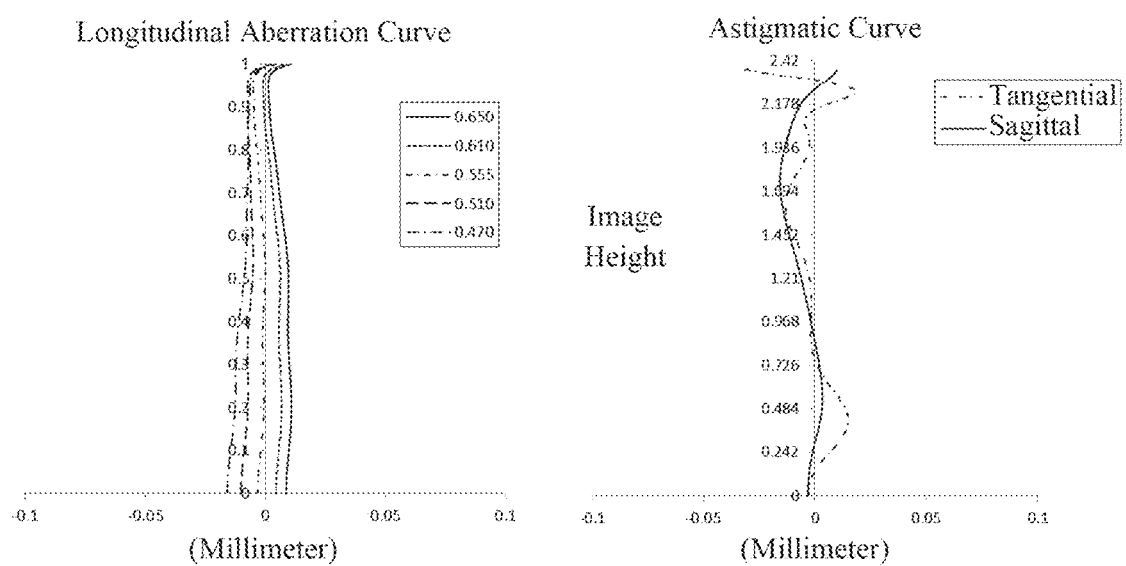

FIG. 10A illustrates a longitudinal aberration curve of the optical imaging system according to Embodiment 4, representing deviations of focal points converged by light of different wavelengths after passing through the optical imaging system. FIG. 10B illustrates an astigmatic curve of the optical imaging system according to Embodiment 4, representing a curvature of a tangential plane and a curvature of a sagittal plane. FIG. 10C illustrates a distortion curve of the optical imaging system according to Embodiment 4, representing amounts of distortion at different image heights. FIG. 10D illustrates a lateral color curve of the optical imaging system according to Embodiment 4, representing deviations of different image heights on the imaging plane after light passes through the optical imaging system. It can be seen from FIG. 10A to FIG. 10D that the optical imaging system provided in Embodiment 4 may achieve good imaging quality.

Embodiment 5

An optical imaging system according to Embodiment 5 of the present disclosure is described below with reference to FIGS. 11 to 12D. FIG. 11 shows a schematic structural diagram of an optical imaging system according to embodiment 5 of the present disclosure.

As shown in FIG. 11, the optical imaging system sequentially includes, along the optical axis from an object side to an image side, an diaphragm STO, a first lens E1, a second lens E2, a third lens E3, a fourth lens E4, and an optical filter E5.

The first lens E1 has a positive refractive power, the object-side surface S1 of the first lens E1 is a convex surface, and the image-side surface S2 of the first lens E1 is a concave surface. The second lens E2 may have a negative refractive power, the object-side surface S3 of the second lens E2 is a convex surface, and the image-side surface S4 of the second lens E2 is a concave surface. The third lens E3 has a positive refractive power, the object-side surface S5 of the third lens E3 is a concave surface, and the image-side surface S6 of the third lens E3 is a convex surface. The fourth lens E4 has a negative refractive power, the object-side surface S7 of the fourth lens E4 is a convex surface, and the image-side surface S8 of the fourth lens E4 is a concave surface. The optical filter E5 has the object-side surface S9 and the image-side surface S10. The optical imaging system has the image plane S11, and light from an object sequentially passes through the respective surfaces S1 to S10 and is finally imaged on the image plane S11.

The optical imaging system of this embodiment may also include a lens barrel. The lens barrel is used to accommodate the first lens E1, the second lens E2, the third lens E3, the fourth lens E4, and the filter E5. Each of the first lens E1, the second lens E2, the third lens E3, the fourth lens E4, and the filter E5 has an object-side bearing surface and an image-side bearing surface, respectively, where spacers may be provided between adjacent lenses.

In Embodiment 5, the value of the total effective focal length f of the optical imaging system is 2.79 mm, the value of the axial distance TTL from the object-side surface S1 of the first lens E1 to the image plane S11 is 3.75 mm, the value of half the diagonal length ImgH of the effective pixel area on the image plane S11 is 2.42 mm, and the value of half of a maximal field-of-view Semi-FOV is 40.5°.

Table 9 below is a table illustrating basic parameters of the optical imaging system of Embodiment 5, where the units for the radius of curvature, the thickness/distance and the focal length are millimeter (mm). Table 10 below shows the high-order coefficients applicable to the aspheric surfaces in the Embodiment 5, where the surface type of each aspheric surface is defined by the formula (1) given in the above Embodiment 1.

TABLE 9

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | 400.0000 | | | | |
| STO | spherical | Infinite | −0.0810 | | | | |
| S1 | aspheric | 1.6131 | 0.5995 | 1.55 | 56.1 | 2.97 | 0.0000 |
| S2 | aspheric | 350.0000 | 0.2652 | | | | 0.0000 |
| S3 | aspheric | 98.8033 | 0.2443 | 1.67 | 20.4 | −6.32 | 0.0000 |
| S4 | aspheric | 4.0305 | 0.3151 | | | | 15.7888 |
| S5 | aspheric | −5.4040 | 0.7222 | 1.55 | 56.1 | 1.50 | 10.8791 |
| S6 | aspheric | −0.7468 | 0.0300 | | | | −1.0000 |
| S7 | aspheric | 2.6302 | 0.4028 | 1.55 | 56.1 | −1.58 | 0.0000 |
| S8 | aspheric | 0.6135 | 0.5664 | | | | −4.4936 |
| S9 | spherical | Infinite | 0.2100 | 1.52 | 64.2 | | |
| S10 | spherical | Infinite | 0.3944 | | | | |
| S11 | spherical | Infinite | | | | | |

TABLE 10

| Surface Number | A4 | A6 | A8 | A10 | A12 | A14 | A16 | A18 | A20 |
|---|---|---|---|---|---|---|---|---|---|
| S1 | −5.7142E−02 | 2.2909E−01 | −4.1095E+00 | 3.2840E+01 | −1.6024E+02 | 4.7771E+02 | −8.5206E+02 | 8.3404E+02 | −3.4452E+02 |
| S2 | −1.8474E−01 | −2.5931E−01 | 3.7828E+00 | −3.1822E+01 | 1.5220E+02 | −4.3205E+02 | 7.2289E+02 | −6.5897E+02 | 2.5242E+02 |
| S3 | −3.5086E−01 | 3.9545E−01 | −2.0987E+00 | 1.2862E+01 | −4.1886E+01 | 9.0739E+01 | −1.2973E+02 | 1.0907E+02 | −4.0391E+01 |
| S4 | −3.2419E−01 | 1.8039E+00 | −1.5360E+01 | 8.7097E+01 | −3.0850E+02 | 6.9404E+02 | −9.6033E+02 | 7.4378E+02 | −2.4646E+02 |
| S5 | −4.2870E−02 | 9.4022E−01 | −7.1528E+00 | 2.5552E+01 | −5.4857E+01 | 7.3003E+01 | −5.8221E+01 | 2.5230E+01 | −4.5555E+00 |
| S6 | 7.8150E−01 | −2.6179E+00 | 7.3749E+00 | −1.6133E+01 | 2.5370E+01 | −2.7134E+01 | 1.8589E+01 | −7.2857E+00 | 1.2299E+00 |
| S7 | −4.9189E−01 | 2.8425E−01 | 1.2950E−02 | −1.1932E−01 | 8.0449E−02 | −2.0241E−02 | −2.4668E−03 | 2.2462E−03 | −3.1417E−04 |
| S8 | −2.6388E−01 | 2.6529E−01 | −2.1286E−01 | 1.2712E−01 | −5.3728E−02 | 1.5045E−02 | −2.5451E−03 | 2.2065E−04 | −6.4463E−06 |

Figure 12A:
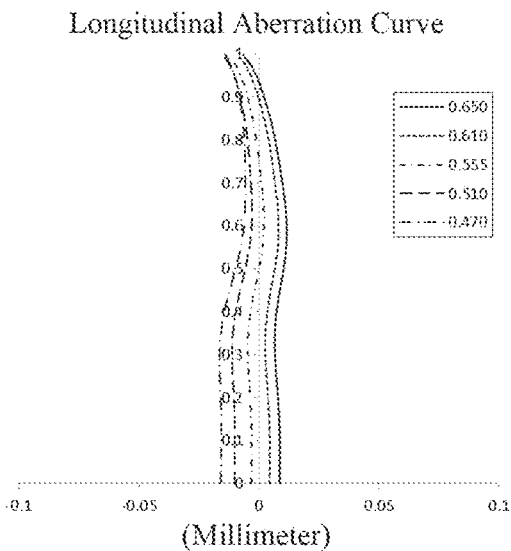
FIGS. 12A to 12D show a longitudinal aberration curve, an astigmatic curve, a distortion curve and a lateral color curve of, respectively, of the optical imaging system of Embodiment 1.
Figure 12B:
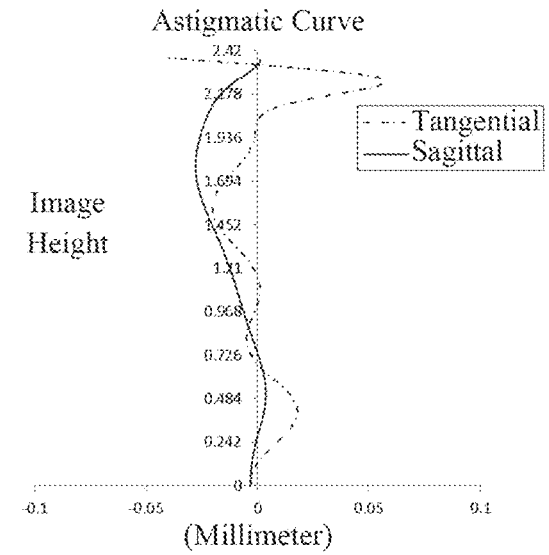
Figure 12C:
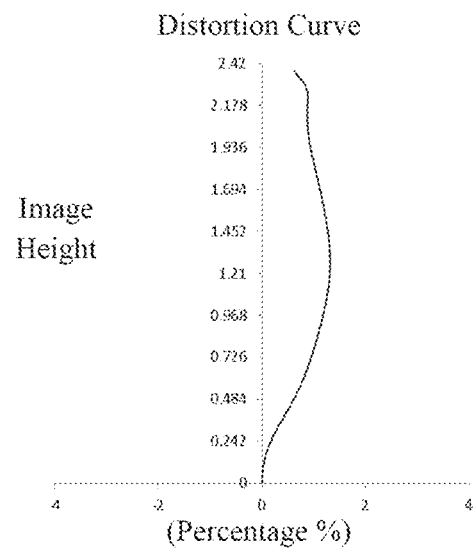
Figure 12D:
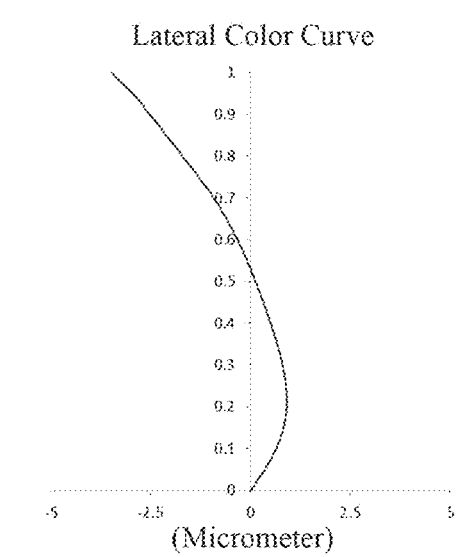

FIG. 12A illustrates a longitudinal aberration curve of the optical imaging system according to Embodiment 5, representing deviations of focal points converged by light of different wavelengths after passing through the optical imaging system. FIG. 12B illustrates an astigmatic curve of the optical imaging system according to Embodiment 5, representing a curvature of a tangential plane and a curvature of a sagittal plane. FIG. 12C illustrates a distortion curve of the optical imaging system according to Embodiment 5, representing amounts of distortion at different image heights. FIG. 12D illustrates a lateral color curve of the optical imaging system according to Embodiment 5, representing deviations of different image heights on the imaging plane after light passes through the optical imaging system. It can be seen from FIG. 12A to FIG. 12D that the optical imaging system provided in Embodiment 5 may achieve good imaging quality.

Embodiment 6

Figure 13:
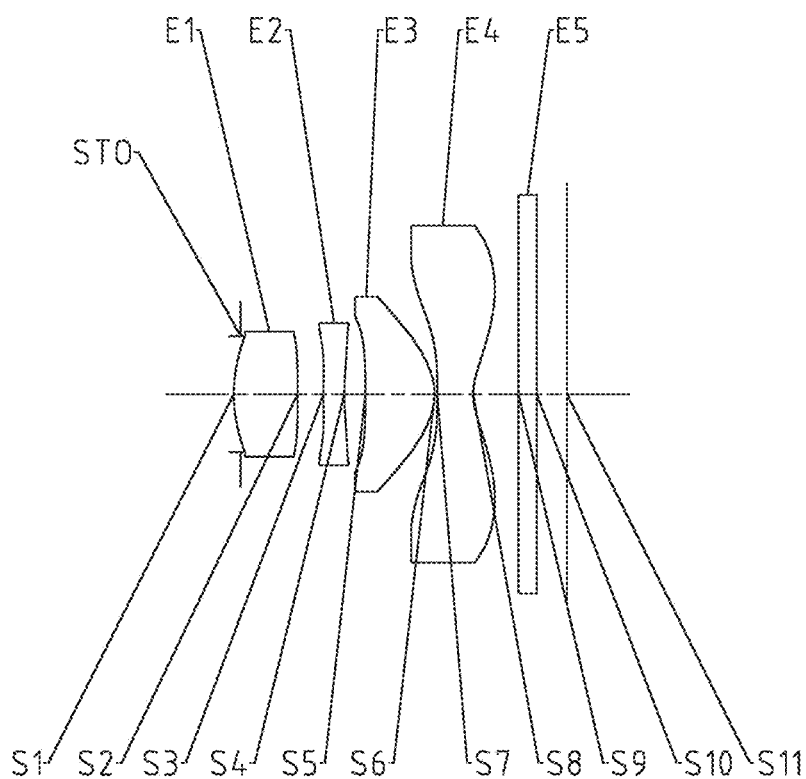
FIG. 13 is a schematic structural diagram of an optical imaging system according to Embodiment 6 of the present disclosure.

An optical imaging system according to Embodiment 6 of the present disclosure is described below with reference to FIGS. 13 to 14D. FIG. 13 shows a schematic structural diagram of an optical imaging system according to embodiment 6 of the present disclosure.

As shown in FIG. 13, the optical imaging system sequentially includes, along the optical axis from an object side to an image side, an diaphragm STO, a first lens E1, a second lens E2, a third lens E3, a fourth lens E4, and an optical filter E5.

The first lens E1 has a positive refractive power, the object-side surface S1 of the first lens E1 is a convex surface, and the image-side surface S2 of the first lens E1 is a concave surface. The second lens E2 may have a negative refractive power, the object-side surface S3 of the second lens E2 is a convex surface, and the image-side surface S4 of the second lens E2 is a concave surface. The third lens E3 has a positive refractive power, the object-side surface S5 of the third lens E3 is a convex surface, and the image-side surface S6 of the third lens E3 is a convex surface. The fourth lens E4 has a negative refractive power, the object-side surface S7 of the fourth lens E4 is a convex surface, and the image-side surface S8 of the fourth lens E4 is a concave surface. The optical filter E5 has the object-side surface S9 and the image-side surface S10. The optical imaging system has the image plane S11, and light from an object sequentially passes through the respective surfaces S1 to S10 and is finally imaged on the image plane S11.

The optical imaging system of this embodiment may also include a lens barrel. The lens barrel is used to accommodate the first lens E1, the second lens E2, the third lens E3, the fourth lens E4, and the filter E5. Each of the first lens E1, the second lens E2, the third lens E3, the fourth lens E4, and the filter E5 has an object-side bearing surface and an image-side bearing surface, respectively, where spacers may be provided between adjacent lenses.

In Embodiment 5, the value of the total effective focal length f of the optical imaging system is 2.79 mm, the value of the axial distance TTL from the object-side surface S1 of the first lens E1 to the image plane S11 is 3.83 mm, the value of half the diagonal length ImgH of the effective pixel area on the image plane S11 is 2.42 mm, and the value of half of a maximal field-of-view Semi-FOV is 40.4°.

Table 11 below is a table illustrating basic parameters of the optical imaging system of Embodiment 6, where the units for the radius of curvature, the thickness/distance and the focal length are millimeter (mm). Table 12 below shows the high-order coefficients applicable to the aspheric surfaces in the Embodiment 6, where the surface type of each aspheric surface is defined by the formula (1) given in the above Embodiment 1.

TABLE 11

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | 400.0000 | | | | |
| STO | spherical | Infinite | −0.0792 | | | | |
| S1 | aspheric | 1.7024 | 0.7322 | 1.55 | 56.1 | 3.13 | 0.2635 |
| S2 | aspheric | 300.0000 | 0.2992 | | | | 99.0000 |
| S3 | aspheric | 6.8416 | 0.2381 | 1.67 | 20.4 | −5.76 | −98.1336 |
| S4 | aspheric | 2.4218 | 0.2427 | | | | 4.4050 |
| S5 | aspheric | 500.0000 | 0.7956 | 1.55 | 56.1 | 1.24 | 99.0000 |
| S6 | aspheric | −0.6756 | 0.0300 | | | | −1.0407 |
| S7 | aspheric | 150.0000 | 0.4138 | 1.55 | 56.1 | −1.25 | 99.0000 |
| S8 | aspheric | 0.6771 | 0.5198 | | | | −5.3765 |
| S9 | spherical | Infinite | 0.2100 | 1.52 | 64.2 | | |
| S10 | spherical | Infinite | 0.3479 | | | | |
| S11 | spherical | Infinite | | | | | |

TABLE 12

| Surface Number | A4 | A6 | A8 | A10 | A12 | A14 | A16 | A18 | A20 |
|---|---|---|---|---|---|---|---|---|---|
| S1 | −6.3505E−02 | 5.8543E−01 | −9.3963E+00 | 8.1346E+01 | −4.3303E+02 | 1.4269E+03 | −2.8331E+03 | 3.1012E+03 | −1.4367E+03 |
| S2 | −2.3233E−01 | 1.0021E+00 | −8.9911E+00 | 5.1070E+01 | −1.8962E+02 | 4.5198E+02 | −6.5833E+02 | 5.2897E+02 | −1.7845E+02 |
| S3 | −7.0028E−01 | 2.8386E+00 | −1.1780E+01 | 2.6689E+01 | −8.2783E+00 | −1.0888E+02 | 2.8161E+02 | −3.0219E+02 | 1.2488E+02 |
| S4 | −8.4068E−01 | 3.3115E+00 | −1.2372E+01 | 3.3689E+01 | −6.5645E+01 | 9.1736E+01 | −8.6887E+01 | 4.9499E+01 | −1.2709E+01 |
| S5 | −3.3368E−01 | 4.1544E−01 | 1.3590E+00 | −1.2652E+01 | 4.6138E+01 | −9.9497E+01 | 1.2746E+02 | −8.8556E+01 | 2.5562E+01 |
| S6 | 6.8822E−01 | −2.5701E+00 | 8.9248E+00 | −2.2867E+01 | 4.0242E+01 | −4.6791E+01 | 3.3993E+01 | −1.3838E+01 | 2.3928E+00 |
| S7 | −5.8632E−01 | 1.1020E+00 | −1.3159E+00 | 8.3695E−01 | −1.2201E−01 | −1.6790E−01 | 1.1018E−01 | −2.7335E−02 | 2.5404E−03 |
| S8 | −2.8967E−01 | 4.0352E−01 | −4.1097E−01 | 2.7599E−01 | −1.2184E−01 | 3.4865E−02 | −6.1823E−03 | 6.1044E−04 | −2.5259E−05 |

Figure 14A:
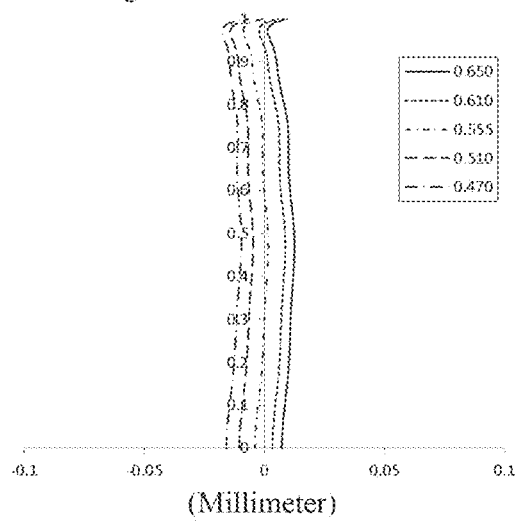
FIGS. 14A to 14D show a longitudinal aberration curve, an astigmatic curve, a distortion curve and a lateral color curve of, respectively, of the optical imaging system of Embodiment 6.
Figure 14B:
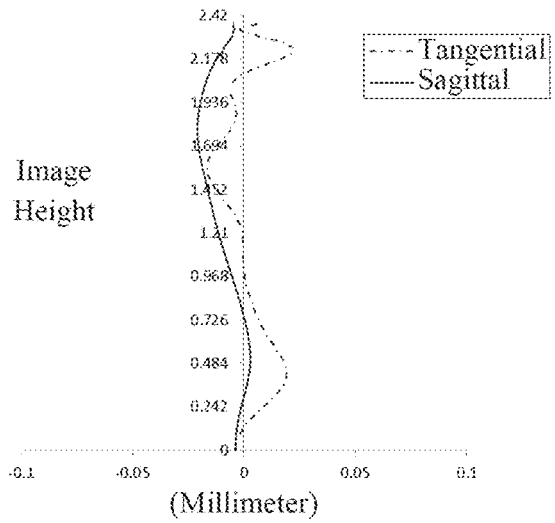
Figures 14C, 14D:
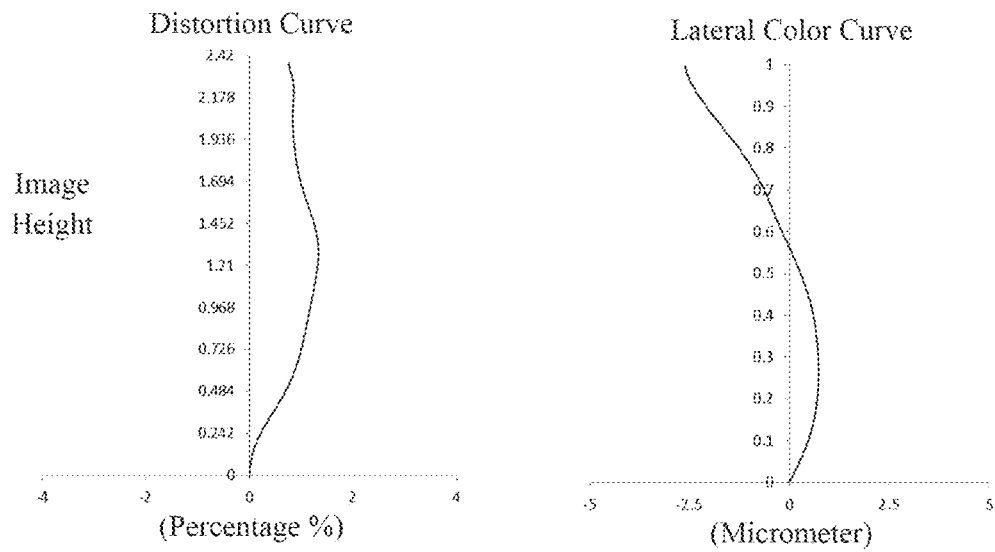

FIG. 14A illustrates a longitudinal aberration curve of the optical imaging system according to Embodiment 6, representing deviations of focal points converged by light of different wavelengths after passing through the optical imaging system. FIG. 14B illustrates an astigmatic curve of the optical imaging system according to Embodiment 6, representing a curvature of a tangential plane and a curvature of a sagittal plane. FIG. 14C illustrates a distortion curve of the optical imaging system according to Embodiment 6, representing amounts of distortion at different image heights. FIG. 14D illustrates a lateral color curve of the optical imaging system according to Embodiment 6, representing deviations of different image heights on the imaging plane after light passes through the optical imaging system. It can be seen from FIG. 14A to FIG. 14D that the optical imaging system provided in Embodiment 6 may achieve good imaging quality.

Embodiment 7

Figure 15:
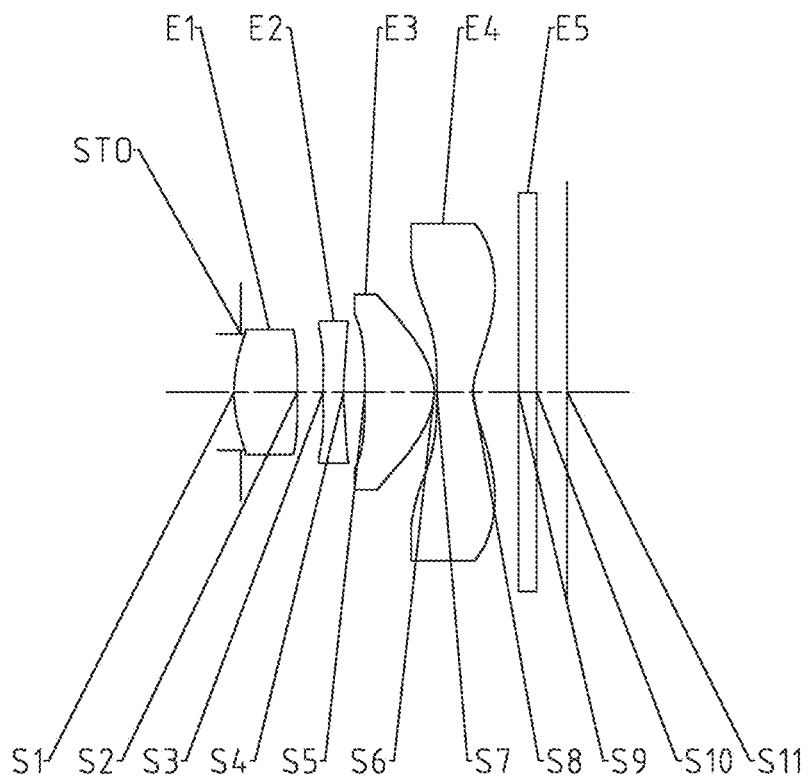
FIG. 15 is a schematic structural diagram of an optical imaging system according to Embodiment 7 of the present disclosure.

An optical imaging system according to Embodiment 7 of the present disclosure is described below with reference to FIGS. 15 to 16D. FIG. 15 shows a schematic structural diagram of an optical imaging system according to embodiment 7 of the present disclosure.

As shown in FIG. 15, the optical imaging system sequentially includes, along the optical axis from an object side to an image side, an diaphragm STO, a first lens E1, a second lens E2, a third lens E3, a fourth lens E4, and an optical filter E5.

The first lens E1 has a positive refractive power, the object-side surface S1 of the first lens E1 is a convex surface, and the image-side surface S2 of the first lens E1 is a concave surface. The second lens E2 may have a negative refractive power, the object-side surface S3 of the second lens E2 is a convex surface, and the image-side surface S4 of the second lens E2 is a concave surface. The third lens E3 has a positive refractive power, the object-side surface S5 of the third lens E3 is a concave surface, and the image-side surface S6 of the third lens E3 is a convex surface. The fourth lens E4 has a negative refractive power, the object-side surface S7 of the fourth lens E4 is a concave surface, and the image-side surface S8 of the fourth lens E4 is a concave surface. The optical filter E5 has the object-side surface S9 and the image-side surface S10. The optical imaging system has the image plane S11, and light from an object sequentially passes through the respective surfaces S1 to S10 and is finally imaged on the image plane S11.

The optical imaging system of this embodiment may also include a lens barrel. The lens barrel is used to accommodate the first lens E1, the second lens E2, the third lens E3, the fourth lens E4, and the filter E5. Each of the first lens E1, the second lens E2, the third lens E3, the fourth lens E4, and the filter E5 has an object-side bearing surface and an image-side bearing surface, respectively, where spacers may be provided between adjacent lenses.

In Embodiment 7, the value of the total effective focal length f of the optical imaging system is 2.79 mm, the value of the axial distance TTL from the object-side surface S1 of the first lens E1 to the image plane S11 is 3.83 mm, the value of half the diagonal length ImgH of the effective pixel area on the image plane S11 is 2.42 mm, and the value of half of a maximal field-of-view Semi-FOV is 40.4°.

Table 13 below is a table illustrating basic parameters of the optical imaging system of Embodiment 7, where the units for the radius of curvature, the thickness/distance and the focal length are millimeter (mm). Table 14 below shows the high-order coefficients applicable to the aspheric surfaces in the Embodiment 7, where the surface type of each aspheric surface is defined by the formula (1) given in the above Embodiment 1.

TABLE 13

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | 400.0000 | | | | |
| STO | spherical | Infinite | −0.0793 | | | | |
| S1 | aspheric | 1.6995 | 0.7269 | 1.55 | 56.1 | 3.13 | 0.2493 |
| S2 | aspheric | 300.0000 | 0.2976 | | | | 99.0000 |
| S3 | aspheric | 6.6442 | 0.2345 | 1.67 | 20.4 | −5.98 | −96.6582 |
| S4 | aspheric | 2.4541 | 0.2454 | | | | 4.5708 |
| S5 | aspheric | −30.0000 | 0.7964 | 1.55 | 56.1 | 1.21 | −99.0000 |
| S6 | aspheric | −0.6550 | 0.0300 | | | | −1.0615 |
| S7 | aspheric | −76.7303 | 0.4166 | 1.55 | 56.1 | −1.22 | −99.0000 |
| S8 | aspheric | 0.6708 | 0.5214 | | | | −5.5315 |
| S9 | spherical | Infinite | 0.2100 | 1.52 | 64.2 | | |
| S10 | spherical | Infinite | 0.3494 | | | | |
| S11 | spherical | Infinite | | | | | |

TABLE 14

| Surface Number | A4 | A6 | A8 | A10 | A12 | A14 | A16 | A18 | A20 |
|---|---|---|---|---|---|---|---|---|---|
| S1 | −6.1400E−02 | 5.1543E−01 | −8.4203E+00 | 7.3313E+01 | −3.9247E+02 | 1.2999E+03 | −2.5927E+03 | 2.8496E+03 | −1.3250E+03 |
| S2 | −2.3067E−01 | 9.1841E−01 | −8.2506E+00 | 4.6620E+01 | −1.7177E+02 | 4.0567E+02 | −5.8397E+02 | 4.6177E+02 | −1.5231E+02 |
| S3 | −6.8263E−01 | 2.7823E+00 | −1.2456E+01 | 3.2745E+01 | −3.2021E+01 | −5.4505E+01 | 2.0751E+02 | −2.4707E+02 | 1.0779E+02 |
| S4 | −7.9409E−01 | 3.1718E+00 | −1.2356E+01 | 3.4655E+01 | −6.7986E+01 | 9.3302E+01 | −8.4608E+01 | 4.5036E+01 | −1.0578E+01 |
| S5 | −2.9987E−01 | 4.3942E−01 | 1.0472E+00 | −1.1629E+01 | 4.3561E+01 | −9.4601E+01 | 1.2155E+02 | −8.4538E+01 | 2.4379E+01 |
| S6 | 8.2390E−01 | −3.1230E+00 | 1.0537E+01 | −2.6375E+01 | 4.5580E+01 | −5.2234E+01 | 3.7508E+01 | −1.5126E+01 | 2.5943E+00 |
| S7 | −4.6637E−01 | 8.0965E−01 | −9.3459E−01 | 5.3748E−01 | 1.5687E−02 | −1.9806E−01 | 1.0939E−01 | −2.5688E−02 | 2.3215E−03 |
| S8 | −2.5778E−01 | 3.3631E−01 | −3.3212E−01 | 2.1671E−01 | −9.2258E−02 | 2.5115E−02 | −4.1428E−03 | 3.6571E−04 | −1.2469E−05 |

Figure 16A:
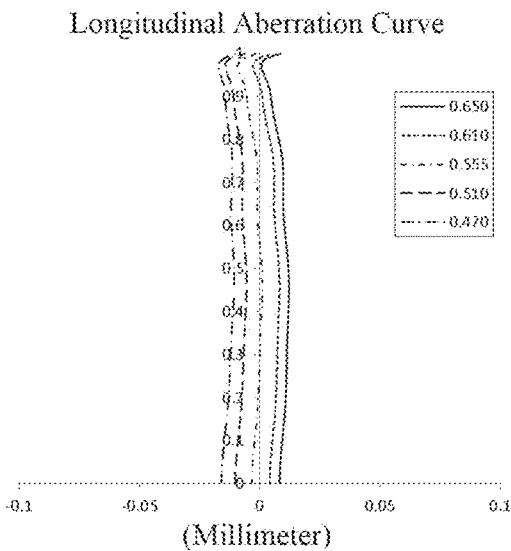
FIGS. 16A to 16D show a longitudinal aberration curve, an astigmatic curve, a distortion curve and a lateral color curve of, respectively, of the optical imaging system of Embodiment 7.
Figure 16B:
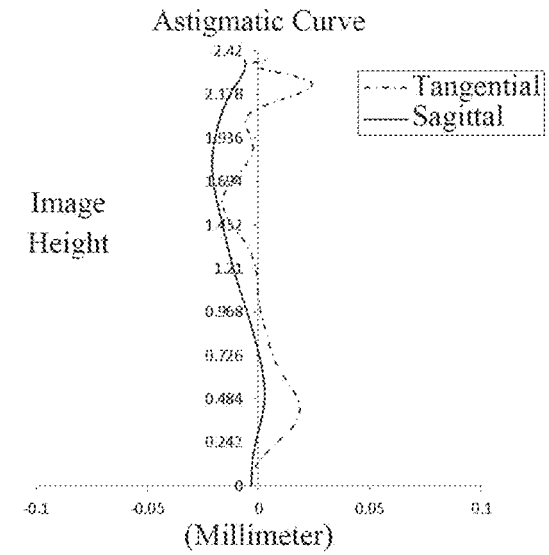
Figure 16C:
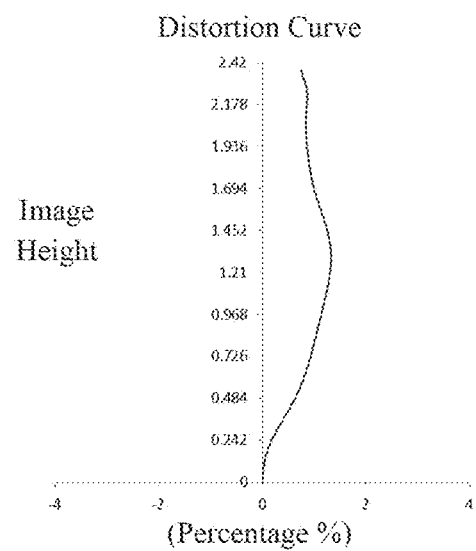
Figure 16D:
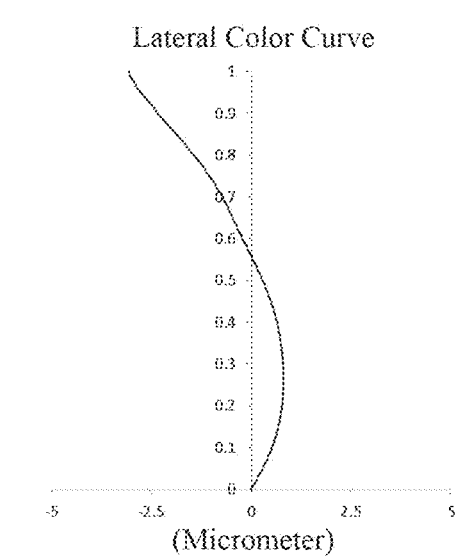

FIG. 16A illustrates a longitudinal aberration curve of the optical imaging system according to Embodiment 7, representing deviations of focal points converged by light of different wavelengths after passing through the optical imaging system. FIG. 16B illustrates an astigmatic curve of the optical imaging system according to Embodiment 7, representing a curvature of a tangential plane and a curvature of a sagittal plane. FIG. 16C illustrates a distortion curve of the optical imaging system according to Embodiment7, representing amounts of distortion at different image heights. FIG. 16D illustrates a lateral color curve of the optical imaging system according to Embodiment 7, representing deviations of different image heights on the imaging plane after light passes through the optical imaging system. It can be seen from FIG. 16A to FIG. 16D that the optical imaging system provided in Embodiment 6 may achieve good imaging quality.

Embodiment 8

Figure 17:
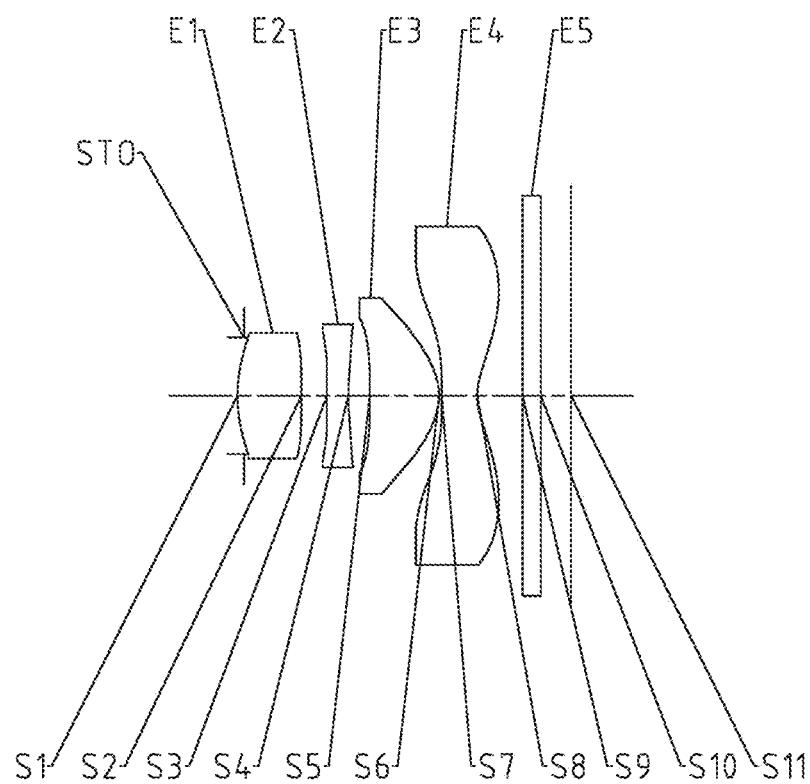
FIG. 17 is a schematic structural diagram of an optical imaging system according to Embodiment 8 of the present disclosure.

An optical imaging system according to Embodiment 8 of the present disclosure is described below with reference to FIGS. 17 to 18D. FIG. 17 shows a schematic structural diagram of an optical imaging system according to embodiment 8 of the present disclosure.

As shown in FIG. 17, the optical imaging system sequentially includes, along the optical axis from an object side to an image side, an diaphragm STO, a first lens E1, a second lens E2, a third lens E3, a fourth lens E4, and an optical filter E5.

The first lens E1 has a positive refractive power, the object-side surface S1 of the first lens E1 is a convex surface, and the image-side surface S2 of the first lens E1 is a convex surface. The second lens E2 may have a negative refractive power, the object-side surface S3 of the second lens E2 is a convex surface, and the image-side surface S4 of the second lens E2 is a concave surface. The third lens E3 has a positive refractive power, the object-side surface S5 of the third lens E3 is a convex surface, and the image-side surface S6 of the third lens E3 is a convex surface. The fourth lens E4 has a negative refractive power, the object-side surface S7 of the fourth lens E4 is a convex surface, and the image-side surface S8 of the fourth lens E4 is a concave surface. The optical filter E5 has the object-side surface S9 and the image-side surface S10. The optical imaging system has the image plane S11, and light from an object sequentially passes through the respective surfaces S1 to S10 and is finally imaged on the image plane S11.

The optical imaging system of this embodiment may also include a lens barrel. The lens barrel is used to accommodate the first lens E1, the second lens E2, the third lens E3, the fourth lens E4, and the filter E5. Each of the first lens E1, the second lens E2, the third lens E3, the fourth lens E4, and the filter E5 has an object-side bearing surface and an image-side bearing surface, respectively, where spacers may be provided between adjacent lenses.

In Embodiment 7, the value of the total effective focal length f of the optical imaging system is 2.78 mm, the value of the axial distance TTL from the object-side surface S1 of the first lens E1 to the image plane S11 is 3.83 mm, the value of half the diagonal length ImgH of the effective pixel area on the image plane S11 is 2.42 mm, and the value of half of a maximal field-of-view Semi-FOV is 40.4°.

Table 15 below is a table illustrating basic parameters of the optical imaging system of Embodiment 8, where the units for the radius of curvature, the thickness/distance and the focal length are millimeter (mm). Table 16 below shows the high-order coefficients applicable to the aspheric surfaces in the Embodiment 8, where the surface type of each aspheric surface is defined by the formula (1) given in the above Embodiment 1.

TABLE 15

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | 400.0000 | | | | |
| STO | spherical | Infinite | −0.0760 | | | | |
| S1 | aspheric | 1.7241 | 0.7336 | 1.55 | 56.1 | 3.10 | 0.2212 |
| S2 | aspheric | −84.7556 | 0.2926 | | | | 99.0000 |
| S3 | aspheric | 6.9499 | 0.2466 | 1.67 | 20.4 | −5.66 | −94.9027 |
| S4 | aspheric | 2.4083 | 0.2458 | | | | 4.3801 |
| S5 | aspheric | 500.0000 | 0.7957 | 1.55 | 56.1 | 1.23 | −99.0000 |
| S6 | aspheric | −0.6698 | 0.0300 | | | | −1.0454 |
| S7 | aspheric | 150.0000 | 0.4077 | 1.55 | 56.1 | −1.23 | 99.0000 |
| S8 | aspheric | 0.6703 | 0.5199 | | | | −5.3761 |
| S9 | spherical | Infinite | 0.2100 | 1.52 | 64.2 | | |
| S10 | spherical | Infinite | 0.3480 | | | | |
| S11 | spherical | Infinite | | | | | |

TABLE 16

| Surface Number | A4 | A6 | A8 | A10 | A12 | A14 | A16 | A18 | A20 |
|---|---|---|---|---|---|---|---|---|---|
| S1 | −6.5905E−02 | 6.2318E−01 | −1.0028E+01 | 8.6871E+01 | −4.6210E+02 | 1.5211E+03 | −3.0173E+03 | 3.3011E+03 | −1.5291E+03 |
| S2 | −2.3411E−01 | 8.3270E−01 | −7.0883E+00 | 3.8378E+01 | −1.3651E+02 | 3.1216E+02 | −4.3368E+02 | 3.2790E+02 | −1.0166E+02 |
| S3 | −6.8461E−01 | 2.7392E+00 | −1.1557E+01 | 2.6858E+01 | −1.0240E+01 | −1.0456E+02 | 2.7729E+02 | −3.0061E+02 | 1.2504E+02 |
| S4 | −8.1820E−01 | 3.2556E+00 | −1.2392E+01 | 3.4148E+01 | −6.6310E+01 | 9.0339E+01 | −8.1637E+01 | 4.3568E+01 | −1.0330E+01 |
| S5 | −3.3947E−01 | 4.9873E−01 | 8.6527E−01 | −1.0634E+01 | 3.9897E+01 | −8.6058E+01 | 1.0936E+02 | −7.5088E+01 | 2.1343E+01 |
| S6 | 7.1129E−01 | −2.6584E+00 | 9.1759E+00 | −2.3421E+01 | 4.1049E+01 | −4.7502E+01 | 3.4341E+01 | −1.3915E+01 | 2.3952E+00 |
| S7 | −5.8885E−01 | 1.1284E+00 | −1.4297E+00 | 1.0533E+00 | −3.4439E−01 | −3.4047E−02 | 6.2832E−02 | −1.8202E−02 | 1.7977E−03 |
| S8 | −2.8851E−01 | 3.9809E−01 | −4.0354E−01 | 2.6987E−01 | −1.1837E−01 | 3.3544E−02 | −5.8662E−03 | 5.6831E−04 | −2.2891E−05 |

Figure 18A:
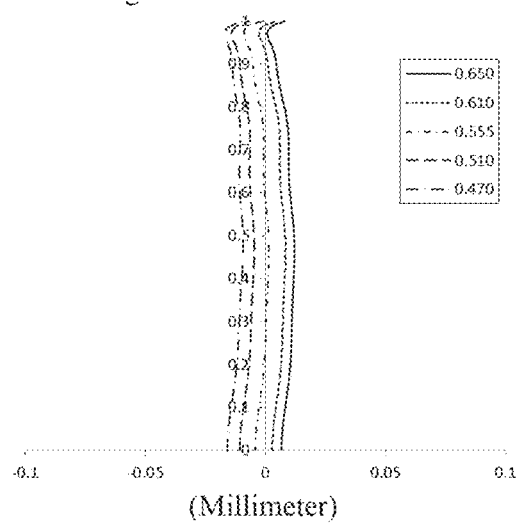
FIGS. 18A to 18D show a longitudinal aberration curve, an astigmatic curve, a distortion curve and a lateral color curve of, respectively, of the optical imaging system of Embodiment 8.
Figure 18B:
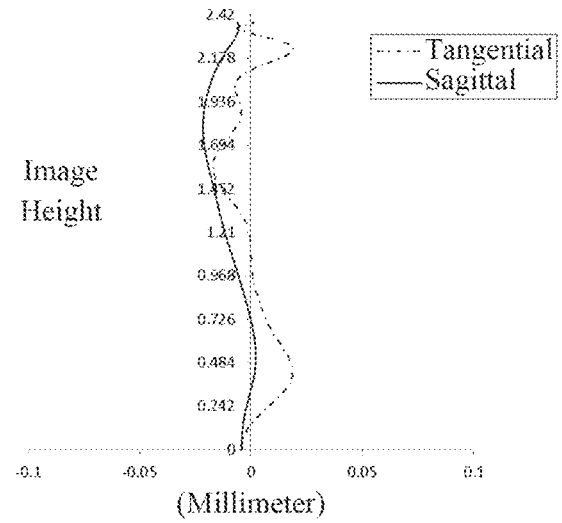
Figures 18C, 18D:
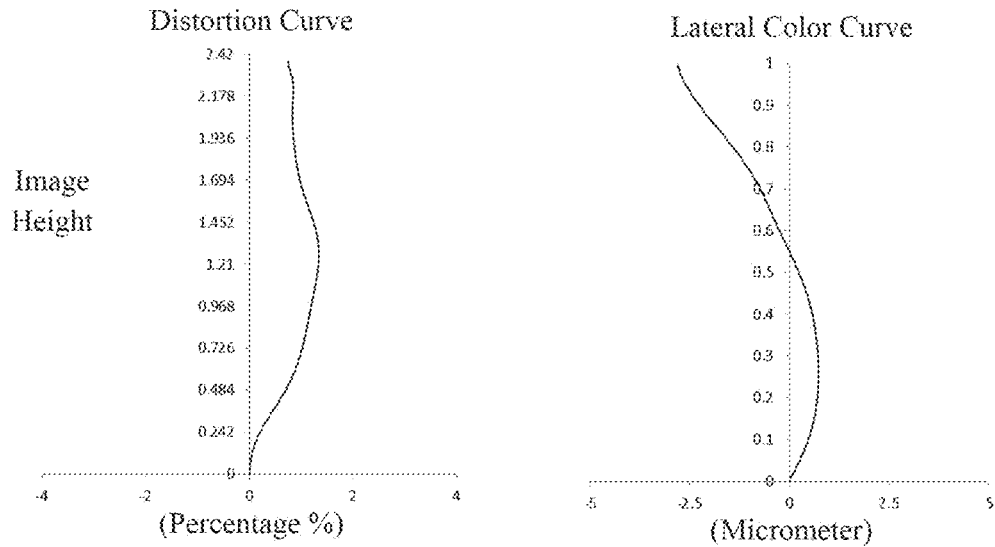

FIG. 18A illustrates a longitudinal aberration curve of the optical imaging system according to Embodiment 8, representing deviations of focal points converged by light of different wavelengths after passing through the optical imaging system. FIG. 18B illustrates an astigmatic curve of the optical imaging system according to Embodiment 8, representing a curvature of a tangential plane and a curvature of a sagittal plane. FIG. 18C illustrates a distortion curve of the optical imaging system according to Embodiment 8, representing amounts of distortion at different image heights. FIG. 18D illustrates a lateral color curve of the optical imaging system according to Embodiment 8, representing deviations of different image heights on the imaging plane after light passes through the optical imaging system. It can be seen from FIG. 18A to FIG. 18D that the optical imaging system provided in Embodiment 6 may achieve good imaging quality.

Embodiment 9

Figure 19:
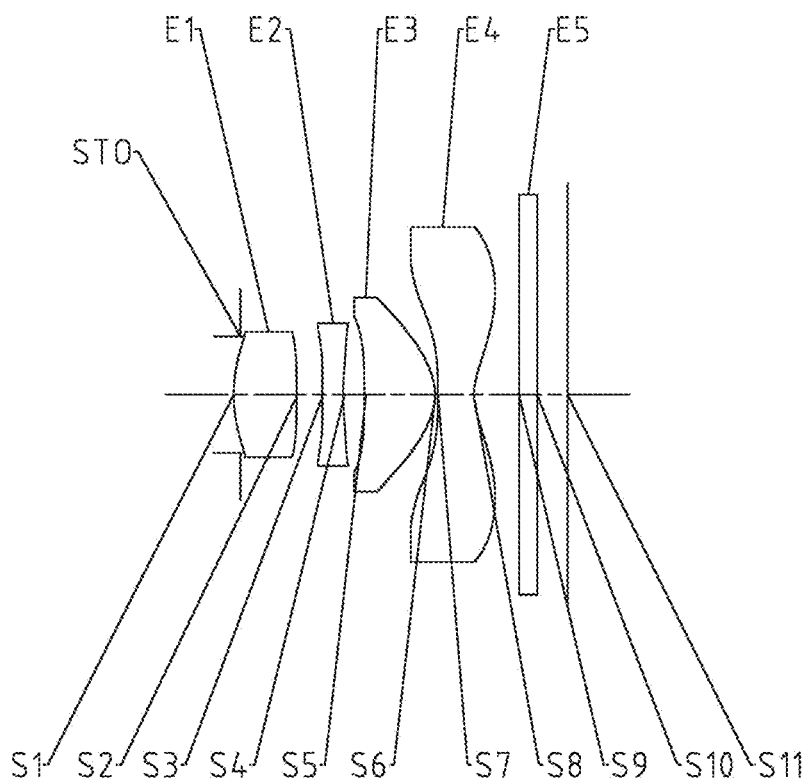
FIG. 19 is a schematic structural diagram of an optical imaging system according to Embodiment 9 of the present disclosure.

An optical imaging system according to Embodiment 9 of the present disclosure is described below with reference to FIGS. 19 to 20D. FIG. 19 shows a schematic structural diagram of an optical imaging system according to embodiment 9 of the present disclosure.

As shown in FIG. 19, the optical imaging system sequentially includes, along the optical axis from an object side to an image side, an diaphragm STO, a first lens E1, a second lens E2, a third lens E3, a fourth lens E4, and an optical filter E5.

The first lens E1 has a positive refractive power, the object-side surface S1 of the first lens E1 is a convex surface, and the image-side surface S2 of the first lens E1 is a convex surface. The second lens E2 may have a negative refractive power, the object-side surface S3 of the second lens E2 is a convex surface, and the image-side surface S4 of the second lens E2 is a concave surface. The third lens E3 has a positive refractive power, the object-side surface S5 of the third lens E3 is a concave surface, and the image-side surface S6 of the third lens E3 is a convex surface. The fourth lens E4 has a negative refractive power, the object-side surface S7 of the fourth lens E4 is a concave surface, and the image-side surface S8 of the fourth lens E4 is a concave surface. The optical filter E5 has the object-side surface S9 and the image-side surface S10. The optical imaging system has the image plane S11, and light from an object sequentially passes through the respective surfaces S1 to S10 and is finally imaged on the image plane S11.

The optical imaging system of this embodiment may also include a lens barrel. The lens barrel is used to accommodate the first lens E1, the second lens E2, the third lens E3, the fourth lens E4, and the filter E5. Each of the first lens E1, the second lens E2, the third lens E3, the fourth lens E4, and the filter E5 has an object-side bearing surface and an image-side bearing surface, respectively, where spacers may be provided between adjacent lenses.

In Embodiment 9, the value of the total effective focal length f of the optical imaging system is 2.78 mm, the value of the axial distance TTL from the object-side surface S1 of the first lens E1 to the image plane S11 is 3.83 mm, the value of half the diagonal length ImgH of the effective pixel area on the image plane S11 is 2.42 mm, and the value of half of a maximal field-of-view Semi-FOV is 40.6°.

Table 17 below is a table illustrating basic parameters of the optical imaging system of Embodiment 9, where the units for the radius of curvature, the thickness/distance and the focal length are millimeter (mm). Table 18 below shows the high-order coefficients applicable to the aspheric surfaces in the Embodiment 9, where the surface type of each aspheric surface is defined by the formula (1) given in the above Embodiment 1.

TABLE 17

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | 400.0000 | | | | |
| STO | spherical | Infinite | −0.0772 | | | | |
| S1 | aspheric | 1.7085 | 0.7213 | 1.55 | 56.1 | 3.10 | 0.2105 |
| S2 | aspheric | −163.9002 | 0.2936 | | | | 0.0000 |
| S3 | aspheric | 6.8189 | 0.2403 | 1.67 | 20.4 | −5.91 | −94.7702 |
| S4 | aspheric | 2.4588 | 0.2445 | | | | 4.6208 |
| S5 | aspheric | −30.8540 | 0.8105 | 1.55 | 56.1 | 1.19 | −99.0000 |
| S6 | aspheric | −0.6427 | 0.0324 | | | | −1.0642 |
| S7 | aspheric | −19.7552 | 0.4141 | 1.55 | 56.1 | −1.18 | −99.0000 |
| S8 | aspheric | 0.6737 | 0.5177 | | | | −5.6143 |
| S9 | spherical | Infinite | 0.2100 | 1.52 | 64.2 | | |
| S10 | spherical | Infinite | 0.3457 | | | | |
| S11 | spherical | Infinite | | | | | |

TABLE 18

| Surface Number | A4 | A6 | A8 | A10 | A12 | A14 | A16 | A18 | A20 |
|---|---|---|---|---|---|---|---|---|---|
| S1 | −6.6921E−02 | 6.3813E−01 | −9.9791E+00 | 8.5905E+01 | −4.6028E+02 | 1.5311E+03 | −3.0634E+03 | 3.3670E+03 | −1.5604E+03 |
| S2 | −2.3543E−01 | 9.4381E−01 | −9.5304E+00 | 6.1172E+01 | −2.5154E+02 | 6.4956E+02 | −1.0101E+03 | 8.6108E+02 | −3.0842E+02 |
| S3 | −6.6448E−01 | 2.3862E+00 | −7.9452E+00 | 1.6471E+00 | 9.9158E+01 | −3.9398E+02 | 7.3341E+02 | −6.9439E+02 | 2.6833E+02 |
| S4 | −7.7751E−01 | 3.1039E+00 | −1.1979E+01 | 3.3028E+01 | −6.4516E+01 | 9.2443E+01 | −9.4197E+01 | 6.0727E+01 | −1.8298E+01 |
| S5 | −3.0809E−01 | 7.6278E−01 | −2.1661E+00 | 5.2389E+00 | −8.9415E+00 | 5.2523E+00 | 7.6830E+00 | −1.3017E+01 | 5.3273E+00 |
| S6 | 8.7775E−01 | −3.6403E+00 | 1.3432E+01 | −3.5937E+01 | 6.4720E+01 | −7.5708E+01 | 5.4740E+01 | −2.2070E+01 | 3.7753E+00 |
| S7 | −4.5633E−01 | 7.8681E−01 | −9.2554E−01 | 5.7557E−01 | −5.0238E−02 | −1.4880E−01 | 8.9852E−02 | −2.1709E−02 | 1.9974E−03 |
| S8 | −2.6226E−01 | 3.4326E−01 | −3.4449E−01 | 2.3088E−01 | −1.0165E−01 | 2.8748E−02 | −4.9570E−03 | 4.6409E−04 | −1.7437E−05 |

Figure 20A:
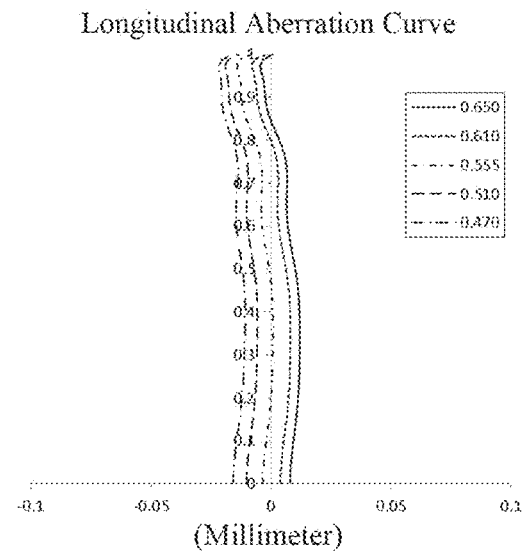
FIGS. 20A to 20D show a longitudinal aberration curve, an astigmatic curve, a distortion curve and a lateral color curve of, respectively, of the optical imaging system of Embodiment 9.
Figure 20B:
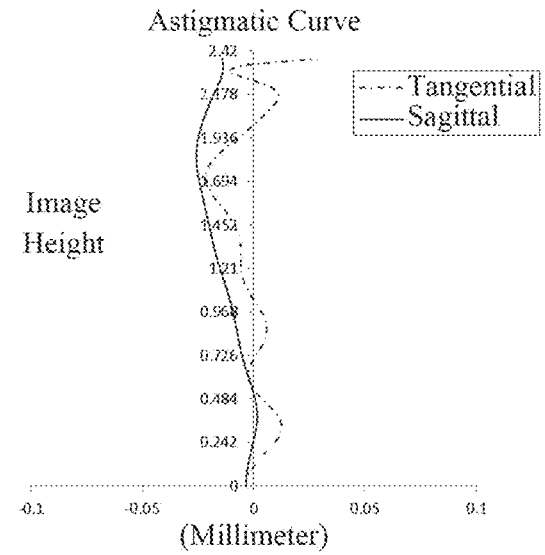
Figure 20C:
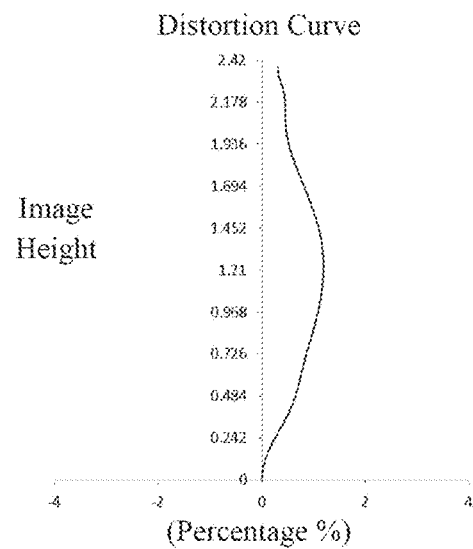

FIG. 20A illustrates a longitudinal aberration curve of the optical imaging system according to Embodiment 9, representing deviations of focal points converged by light of different wavelengths after passing through the optical imaging system. FIG. 20B illustrates an astigmatic curve of the optical imaging system according to Embodiment 9, representing a curvature of a tangential plane and a curvature of a sagittal plane. FIG. 20C illustrates a distortion curve of the optical imaging system according to Embodiment 9, representing amounts of distortion at different image heights.

Figure 20D:
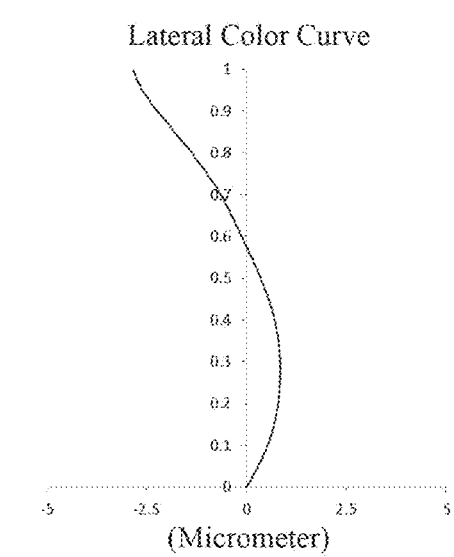

FIG. 20D illustrates a lateral color curve of the optical imaging system according to Embodiment 9, representing deviations of different image heights on the imaging plane after light passes through the optical imaging system. It can be seen from FIG. 20A to FIG. 20D that the optical imaging system provided in Embodiment 6 may achieve good imaging quality.

To sum up, in Embodiments 1-9 described above, the conditional expressions satisfy the relationships shown in Table 19 below.

TABLE 19

| Conditional Expression | Embodiment 1 | 2 | 3 | 4 | 5 | 6 | 7 | 8 | 9 |
|---|---|---|---|---|---|---|---|---|---|
| 2 × DT11/D | 0.53 | 0.53 | 0.53 | 0.51 | 0.51 | 0.51 | 0.51 | 0.50 | 0.50 |
| LA/LB | 1.57 | 1.57 | 1.57 | 1.65 | 1.72 | 2.21 | 2.16 | 2.17 | 2.15 |
| LE (mm) | 0.97 | 0.91 | 0.95 | 0.85 | 0.83 | 0.92 | 0.93 | 0.84 | 0.70 |
| L4 (mm) | 0.55 | 0.51 | 0.50 | 0.43 | 0.35 | 0.30 | 0.31 | 0.32 | 0.34 |
| TTL/ImgH | 1.56 | 1.56 | 1.56 | 1.56 | 1.55 | 1.58 | 1.58 | 1.58 | 1.58 |
| DT11/ImgH | 0.27 | 0.27 | 0.27 | 0.28 | 0.28 | 0.28 | 0.28 | 0.28 | 0.28 |
| ET1/DT12 | 0.75 | 0.75 | 0.74 | 0.59 | 0.62 | 0.77 | 0.76 | 0.77 | 0.75 |
| DT31/DT41 | 0.48 | 0.47 | 0.47 | 0.52 | 0.57 | 0.59 | 0.58 | 0.58 | 0.59 |
| ET3/CT3 | 0.48 | 0.49 | 0.49 | 0.43 | 0.35 | 0.32 | 0.32 | 0.32 | 0.32 |
| CT4/ET4 | 0.78 | 0.77 | 0.77 | 0.62 | 0.62 | 0.57 | 0.57 | 0.57 | 0.56 |
| f3/f1 | 0.60 | 0.59 | 0.60 | 0.57 | 0.51 | 0.39 | 0.39 | 0.39 | 0.38 |
| f/f2-f/f4 | 1.22 | 1.24 | 1.21 | 1.33 | 1.33 | 1.75 | 1.83 | 1.76 | 1.88 |
| R6/f3 | −0.44 | −0.45 | −0.44 | −0.47 | −0.50 | −0.55 | −0.54 | −0.55 | −0.54 |
| R8/R1 | 0.46 | 0.46 | 0.46 | 0.38 | 0.38 | 0.40 | 0.39 | 0.39 | 0.39 |

The present disclosure further provides an imaging device, having a photosensitive element which may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the optical imaging system described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging system comprising:
   an optical lens group, from an object side to an image side along an optical axis sequentially including a first lens, a second lens, a third lens, and a fourth lens;
   a lens barrel, the lens barrel being for accommodating the optical lens group; and
   a plurality of spacers, the plurality of spacers including at least two spacers disposed between the third lens and the fourth lens;
   a diameter D of the lens barrel at an end towards the object side and a maximum effective radius DT11 of an object-side surface of the first lens satisfy $2 \times DT11/D \geq 0.5$;
   wherein an effective focal length f3 of the third lens and a radius of curvature R6 of an image-side surface of the third lens satisfy $-0.8 < R6/f3 < -0.3$.

2. The optical imaging system according to claim 1, wherein the plurality of spacers further comprise:
   a first spacer, the first spacer being disposed between the first lens and the second lens;
   a distance LA from an object-side bearing surface of the first lens to an image-side bearing surface of the first lens and a distance LB from an object-side bearing surface of the second lens to an image-side bearing surface of the second lens satisfy $1.5 < LA/LB < 2.5$.

3. The optical imaging system according to claim 1, wherein the plurality of spacers comprise:
   a second spacer, the second spacer being disposed between the second lens and the third lens;
   a third spacer, the third spacer being disposed between the third lens and the fourth lens; and
   a fourth spacer, the fourth spacer being disposed between the third spacer and the fourth lens;
   one of the third spacer and the fourth spacer is a metal spacer and the other is a plastic spacer;
   a difference LE between an effective radius of the third lens and an effective radius of the fourth lens satisfies $LE \geq 0.5$ mm;
   a distance L4 from an image-side bearing surface of the third lens to an object-side bearing surface of the fourth lens satisfies $L4 \geq 0.3$ mm.

4. The optical imaging system according to claim 1, further comprising a clamping ring, the clamping ring being disposed in the image-side direction of the fourth lens.

5. The optical imaging system according to claim 1, wherein the first lens has a positive refractive power and an object-side surface thereof is convex;
   the second lens has a negative refractive power;
   the third lens has a positive refractive power, and an image-side surface thereof is convex; and
   the fourth lens has a negative refractive power and an image-side surface thereof is concave.

6. The optical imaging system according to claim 1, wherein an axial distance TTL from the object-side surface of the first lens to an image plane of the optical imaging system and half of a diagonal length ImgH of an effective pixel area on the image plane satisfy $TTL/ImgH < 1.6$; and
   a maximum effective radius DT11 of the object-side surface of the first lens and the half of a diagonal length ImgH of an effective pixel area on the image plane satisfy $DT11/ImgH < 0.3$.

7. The optical imaging system according to claim 1, wherein a maximum effective radius DT12 of the image-side surface of the first lens and an edge thickness ET1 of the first lens satisfy $0.4 < ET1/DT12 < 0.9$.

8. The optical imaging system according to claim 1, wherein a maximum effective radius DT31 of an object-side surface of the third lens and a maximum effective radius DT41 of an object-side surface of the fourth lens satisfy $0.3 < DT31/DT41 < 0.8$.

9. The optical imaging system according to claim 1, wherein an edge thickness ET3 of the third lens and a center thickness CT3 of the third lens on the optical axis satisfy $0.2 < ET3/CT3 < 0.7$.

10. The optical imaging system according to claim 1, wherein a center thickness CT4 of the fourth lens on the optical axis and an edge thickness ET4 of the fourth lens satisfy $0.4 < CT4/ET4 < 0.9$.

11. The optical imaging system according to claim 1, wherein an effective focal length f1 of the first lens and an effective focal length f3 of the third lens satisfy $0.2 < f3/f1 < 0.7$.

12. The optical imaging system according to claim 1, wherein a total effective focal length f of the optical imaging system, an effective focal length f2 of the second lens, and an effective focal length f4 of the fourth lens satisfy $1.0 < f/f2-f/f4 < 2.0$.

13. The optical imaging system according to claim 1, wherein a radius of curvature R1 of an object-side surface of the first lens and a radius of curvature R8 of an image-side surface of the fourth lens satisfy $0.2 < R8/R1 < 0.7$.

14. An optical imaging system, the optical imaging system comprising an optical lens group;
   the optical lens group, along an optical axis from an object side to an image side sequentially includes a first lens, a second lens, a third lens, and a fourth lens;
   a maximum effective radius DT12 of an image-side surface of the first lens and an edge thickness ET1 of the first lens satisfy $0.4 < ET1/DT12 < 0.9$;
   wherein a radius of curvature R1 of an object-side surface of the first lens and a radius of curvature R8 of an image-side surface of the fourth lens satisfy $0.2 < R8/R1 < 0.7$;
   wherein the first lens has a positive refractive power and an object-side surface thereof is convex;
   the second lens has a negative refractive power;
   the third lens has a positive refractive power, and an image-side surface thereof is convex;
   the fourth lens has a negative refractive power and an image-side surface thereof is concave.

15. The optical imaging system according to claim 14, further comprising a lens barrel, the optical lens group being disposed in the lens barrel;
- a diameter D of the lens barrel at an end towards the object side and a maximum effective radius DT11 of an object-side surface of the first lens satisfy $2 \times DT11/D \geq 0.5$.

16. The optical imaging system according to claim 14, further comprising:
- a first spacer, the first spacer being disposed between the first lens and the second lens;
- a distance LA from an object-side bearing surface of the first lens to an image-side bearing surface of the first lens and a distance LB from an object-side bearing surface of the second lens to an image-side bearing surface of the second lens satisfy $1.5 < LA/LB < 2.5$, wherein the optical imaging system further comprises:
- a second spacer, the second spacer being disposed between the second lens and the third lens;
- a third spacer, the third spacer being disposed between the third lens and the fourth lens; and
- a fourth spacer, the fourth spacer being disposed between the third spacer and the fourth lens;
- one of the third spacer and the fourth spacer is a metal spacer and the other is a plastic spacer;
- a difference LE between an effective radius of the third lens and an effective radius of the fourth lens satisfies $LE \geq 0.5$ mm;
- a distance L4 from an image-side bearing surface of the third lens to an object-side bearing surface of the fourth lens satisfies $L4 \geq 0.3$ mm.

17. The optical imaging system according to claim 14, further comprising a clamping ring, the clamping ring being disposed in the image-side direction of the fourth lens.

18. The optical imaging system according to claim 14, wherein an axial distance TTL from the object-side surface of the first lens to an image plane of the optical imaging system and half of a diagonal length ImgH of an effective pixel area on the image plane satisfy $TTL/ImgH < 1.6$;
- a maximum effective radius DT11 of the object side surface of the first lens and the half of a diagonal length ImgH of an effective pixel area on the image plane satisfy $DT11/ImgH < 0.3$.

* * * * *